US009634928B2

(12) United States Patent
Choudhury et al.

(10) Patent No.: US 9,634,928 B2
(45) Date of Patent: Apr. 25, 2017

(54) MESH NETWORK OF SIMPLE NODES WITH CENTRALIZED CONTROL

(71) Applicant: Juniper Networks, Inc., Sunnyvale, CA (US)

(72) Inventors: Abhijit Kumar Choudhury, Cupertino, CA (US); James Michael Murphy, Alameda, CA (US); Jayabharat Boddu, Los Altos, CA (US); Pradeep Sindhu, Los Altos Hills, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 76 days.

(21) Appl. No.: 14/500,793

(22) Filed: Sep. 29, 2014

(65) Prior Publication Data
US 2016/0094398 A1    Mar. 31, 2016

(51) Int. Cl.
*H04L 12/717* (2013.01)
*H04W 40/04* (2009.01)
*H04W 40/24* (2009.01)
*H04L 12/751* (2013.01)
*H04L 12/703* (2013.01)
*H04W 84/18* (2009.01)

(52) U.S. Cl.
CPC .............. *H04L 45/42* (2013.01); *H04L 45/02* (2013.01); *H04L 45/28* (2013.01); *H04W 40/04* (2013.01); *H04W 40/24* (2013.01); *H04W 84/18* (2013.01)

(58) Field of Classification Search
None
See application file for complete search history.

(56) References Cited

U.S. PATENT DOCUMENTS

| 5,317,566 A | * | 5/1994 | Joshi | ............... H04Q 3/66 370/238 |
| 6,977,931 B1 | * | 12/2005 | Hadziomerovic | ...... H04L 45/02 370/238 |
| 7,263,061 B2 | | 8/2007 | Yamada | |

(Continued)

FOREIGN PATENT DOCUMENTS

| CN | 1488215 A | 4/2004 |
| EP | 1653688 A1 | 10/2005 |

(Continued)

OTHER PUBLICATIONS

Shaikh (Shaikh FK, Zeadally S, Siddiqui F. Energy efficient routing in wireless sensor networks. In: Chilamkurti N, Zeadally S, Chaouchi H, editors. Next-generation wireless technologies: 4G and beyond, computer communications and networks. London: Springer ; 2013. p. 131-57.).*

(Continued)

*Primary Examiner* — Ayaz Sheikh
*Assistant Examiner* — Tarell Hampton
(74) *Attorney, Agent, or Firm* — Shumaker & Sieffert, P.A.

(57) ABSTRACT

A mesh network of wired and/or wireless nodes is described in which a centralized controller provides seamless end-to-end service from the edge of the mesh network to mesh nodes located proximate to subscriber devices. The controller operates to provide a central configuration point for configuring forwarding planes of the mesh nodes of the mesh network, so as to set up transport data channels to transport traffic from the edge nodes via the mesh nodes to the subscriber devices.

38 Claims, 13 Drawing Sheets

(56) References Cited

U.S. PATENT DOCUMENTS

| | | | |
|---|---|---|---|
| 7,286,529 B1 | 10/2007 | Thomas | |
| 7,835,301 B1* | 11/2010 | Maufer | H04W 24/02 370/254 |
| 8,018,880 B2 | 9/2011 | Figueira et al. | |
| 8,085,791 B1 | 12/2011 | Aggarwal et al. | |
| 8,259,718 B2 | 9/2012 | Akahane et al. | |
| 8,504,718 B2 | 8/2013 | Wang et al. | |
| 8,635,326 B1 | 1/2014 | Chaganti et al. | |
| 8,693,374 B1 | 4/2014 | Murphy et al. | |
| 8,700,801 B2 | 4/2014 | Medved et al. | |
| 8,711,855 B1 | 4/2014 | Murphy et al. | |
| 2002/0001313 A1* | 1/2002 | Benayoun | H04L 49/602 370/466 |
| 2002/0071390 A1 | 6/2002 | Reeves et al. | |
| 2002/0141378 A1* | 10/2002 | Bays | H04L 41/0893 370/351 |
| 2003/0026268 A1 | 2/2003 | Navas | |
| 2003/0027577 A1* | 2/2003 | Brown | H04W 72/00 455/445 |
| 2004/0120710 A1 | 6/2004 | Seddigh et al. | |
| 2004/0174900 A1* | 9/2004 | Volpi | H04L 29/06 370/466 |
| 2005/0117576 A1 | 6/2005 | McDysan et al. | |
| 2005/0152286 A1 | 7/2005 | Betts et al. | |
| 2006/0133272 A1* | 6/2006 | Yuan | H04L 12/5695 370/230 |
| 2006/0268749 A1* | 11/2006 | Rahman | H04L 45/02 370/256 |
| 2007/0076730 A1* | 4/2007 | Rahman | H04W 92/02 370/406 |
| 2007/0177511 A1* | 8/2007 | Das | H04L 45/42 370/238 |
| 2007/0286198 A1 | 12/2007 | Muirhead et al. | |
| 2008/0159311 A1 | 7/2008 | Martinotti et al. | |
| 2008/0170550 A1* | 7/2008 | Liu | H04W 40/26 370/338 |
| 2008/0225864 A1 | 9/2008 | Aissaoui et al. | |
| 2008/0228943 A1 | 9/2008 | Balus et al. | |
| 2008/0239970 A1 | 10/2008 | Lu et al. | |
| 2008/0247406 A1 | 10/2008 | Figueira et al. | |
| 2010/0322141 A1* | 12/2010 | Liu | H04W 24/10 370/315 |
| 2011/0235524 A1 | 9/2011 | North et al. | |
| 2011/0235545 A1 | 9/2011 | Subramanian et al. | |
| 2012/0096211 A1* | 4/2012 | Davis | H04L 49/101 710/314 |
| 2012/0320926 A1 | 12/2012 | Kamath et al. | |
| 2013/0039214 A1* | 2/2013 | Yedavalli | H04L 45/025 370/254 |
| 2013/0083724 A1* | 4/2013 | Sindhu | H04L 45/50 370/328 |
| 2013/0083782 A1 | 4/2013 | Murphy et al. | |
| 2013/0103818 A1 | 4/2013 | Koponen et al. | |
| 2013/0121164 A1 | 5/2013 | Shabtay et al. | |
| 2013/0304915 A1* | 11/2013 | Kawai | H04L 43/026 709/224 |
| 2014/0177637 A1* | 6/2014 | Duncan | H04L 45/507 370/395.5 |
| 2014/0211615 A1 | 7/2014 | Murphy et al. | |

FOREIGN PATENT DOCUMENTS

| | | |
|---|---|---|
| EP | 1653675 A1 | 5/2006 |
| EP | 1653690 A1 | 5/2006 |
| WO | 2008118467 A1 | 10/2008 |

OTHER PUBLICATIONS

J. Moy, RFC 2328: OSPF version 2, 1998.*

The Dynamic Source Routing Protocol (Maltz, D.A., Johnson, D.B., Hu, Y.: The dynamic source routing protocol (DSR) for mobile ad hoc networks for IPv4. RFC 4728, The Internet Engineering Task Force, Network Working Group (2007), http://www.ietf.org/rfc/rfc4728.txt).*

Kumar, S., Murthy, G. R., and Chilamkurti, N. 2013. Cooperative Mesh Networks, N. Chilamkurti et al. (eds.), Next-Generation Wireless Technologies, Computer Communications and Networks.*

Notice of Allowance from U.S. Appl. No. 14/672,058, mailed Jun. 8, 2015, 14 pp.

Office Action from U.S. Appl. No. 14/231,350, dated Jul. 8, 2015, 30 pp.

Notice of Allowance from U.S. Appl. No. 14/231,350, mailed Jan. 21, 2016, 9 pp.

Atlas et al., "Interface to the Routing System Framework," Network Working Group, Internet-Draft, Jul. 30, 2012, 21 pp.

Choudhury et al., "Cloud Control Protocol," draft-ccp-02, Network Working Group, Internet-Draft, Nov. 16, 2012, 21 pp.

Fedyk et al., "GMPLS Control of Ethernet IVL Switches," Nortel, Oct. 2005, 16 pp.

Furquan et al., "ForCES Element Bindings and Topology Discovery Protocol: draft-anasari-forces-discovery-00.txt," Lucent Tech. Hormuzd Khosravi Intel Corp., Jul. 10, 2004, 14 pp.

Gredler et al., "Advertising Link-State Information in BGP," draft-gredler-bgp-te-01, Inter-Domain Routing, Internet-Draft, Jul. 11, 2011, 24 pp.

"OpenFlow 1.2," Open Flow Switch Specification, Version 1.2 (Wire Protocol 0x03), Open Network Foundation, Dec. 5, 2011, 83 pp.

Vasseur et al., Path Computation Element (PCE) Communication Protocol (PCEP), Network Working Group, RFC 5440, Mar. 2009, 88 pp.

U.S. Appl. No. 13/324,861, by Jan Medved, filed Dec. 13, 2011.

U.S. Provisional Patent Application "Optical Access Network Having Emitter-Free Customer Premise Equipment and Adaptive Communication Scheduling," filed Dec. 16, 2012.

European Search Report from European Counterpart Application No. 13197643.3, dated Feb. 26, 2014, 8 pp.

Prosecution History from U.S. Pat. No. 8,693,374, dated Jul. 1, 2013 through Mar. 15, 2014, 57 pp.

Prosecution History from U.S. Pat. No. 8,711,855, dated Sep. 9, 2013 through Feb. 20, 2014, 51 pp.

"Wireless Mesh," Black Box Network Services, blackbox.com/go/SmartPath, first accessed Sep. 14, 2011, 12 pp.

Notice of Allowance from U.S. Appl. No. 14/788,282, mailed Nov. 4, 2016, 12 pp.

Office Action from U.S. Appl. No. 14/672,068, dated Dec. 15, 2016, 8 pp.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                           Instance                            |
+-+-+-+-+-+-+-+-+-+-+-+-+-+-+-+-+-+-+-+-+-+-+-+-+-+-+-+-+-+-+-+-+
|                       Generation Number                       |
+-+-+-+-+-+-+-+-+-+-+-+-+-+-+-+-+-+-+-+-+-+-+-+-+-+-+-+-+-+-+-+-+
|          INL Start            |           INL End             |
+-+-+-+-+-+-+-+-+-+-+-+-+-+-+-+-+-+-+-+-+-+-+-+-+-+-+-+-+-+-+-+-+
|                      Neighbor Node List...                    |
+-+-+-+-+-+-+-+-+-+-+-+-+-+-+-+-+-+-+-+-+-+-+-+-+-+-+-+-+-+-+-+-+
|                              ...                              |
.                                                               .
.                                                               .
+-+-+-+-+-+-+-+-+-+-+-+-+-+-+-+-+-+-+-+-+-+-+-+-+-+-+-+-+-+-+-+-+
|                      ...Neighbor Node List                    |
+-+-+-+-+-+-+-+-+-+-+-+-+-+-+-+-+-+-+-+-+-+-+-+-+-+-+-+-+-+-+-+-+
|                     Intermediate Node List...                 |
+-+-+-+-+-+-+-+-+-+-+-+-+-+-+-+-+-+-+-+-+-+-+-+-+-+-+-+-+-+-+-+-+
|                              ...                              |
.                                                               .
.                                                               .
+-+-+-+-+-+-+-+-+-+-+-+-+-+-+-+-+-+-+-+-+-+-+-+-+-+-+-+-+-+-+-+-+
|                    ...Intermediate Node List                  |
+-+-+-+-+-+-+-+-+-+-+-+-+-+-+-+-+-+-+-+-+-+-+-+-+-+-+-+-+-+-+-+-+
```

FIG. 11

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                       Neighbor MAC Address...                 |
+-+-+-+-+-+-+-+-+-+-+-+-+-+-+-+-+-+-+-+-+-+-+-+-+-+-+-+-+-+-+-+-+
|  ...Neighbor MAC Address      |   Local Link  |  Remote Link  |
+-+-+-+-+-+-+-+-+-+-+-+-+-+-+-+-+-+-+-+-+-+-+-+-+-+-+-+-+-+-+-+-+
```

FIG. 12

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| R |Length | OP |M|Value|          Incoming Label               |
+-+-+-+-+-+-+-+-+-+-+-+-+-+-+-+-+-+-+-+-+-+-+-+-+-+-+-+-+-+-+-+-+
|                            PATH ID                             |
+-+-+-+-+-+-+-+-+-+-+-+-+-+-+-+-+-+-+-+-+-+-+-+-+-+-+-+-+-+-+-+-+
| Primary Port  | R |PA |       Primary Egress Label             |
+-+-+-+-+-+-+-+-+-+-+-+-+-+-+-+-+-+-+-+-+-+-+-+-+-+-+-+-+-+-+-+-+
| Detour Port   | R |DA1|       Detour Egress Label 1            |
+-+-+-+-+-+-+-+-+-+-+-+-+-+-+-+-+-+-+-+-+-+-+-+-+-+-+-+-+-+-+-+-+
|       R               |DA2|   Detour Egress Label 2            |
+-+-+-+-+-+-+-+-+-+-+-+-+-+-+-+-+-+-+-+-+-+-+-+-+-+-+-+-+-+-+-+-+
```

FIG. 18

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                                              |  Total Entries |
+-+-+-+-+-+-+-+-+-+-+-+-+-+-+-+-+-+-+-+-+-+-+-+-+-+-+-+-+-+-+-+-+
|                 FIB Parse Status Entry  ...                    |
+-+-+-+-+-+-+-+-+-+-+-+-+-+-+-+-+-+-+-+-+-+-+-+-+-+-+-+-+-+-+-+-+
|                            ...                                 |

+-+-+-+-+-+-+-+-+-+-+-+-+-+-+-+-+-+-+-+-+-+-+-+-+-+-+-+-+-+-+-+-+
|                 ...   FIB Parse Status Entry                   |
+-+-+-+-+-+-+-+-+-+-+-+-+-+-+-+-+-+-+-+-+-+-+-+-+-+-+-+-+-+-+-+-+
```

FIG. 19

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                  Reserved                    |     Status     |
+-+-+-+-+-+-+-+-+-+-+-+-+-+-+-+-+-+-+-+-+-+-+-+-+-+-+-+-+-+-+-+-+
|                           PATH ID                              |
+-+-+-+-+-+-+-+-+-+-+-+-+-+-+-+-+-+-+-+-+-+-+-+-+-+-+-+-+-+-+-+-+
```

FIG. 20

MESH NETWORK OF SIMPLE NODES WITH CENTRALIZED CONTROL

TECHNICAL FIELD

The disclosure relates to computer networks.

BACKGROUND

A wide variety of devices connect to networks to access resources and services provided by packet-based data networks, such as the Internet, enterprise intranets, content providers and virtual private networks (VPNs). For example, many fixed computers utilize fixed communication links, such as optical, digital subscriber line, or cable-based connections, of networks to access the packet-based services. In addition, a vast amount of mobile devices, such as cellular or mobile smart phones and feature phones, tablet computers, and laptop computers, utilize mobile connections, such as cellular radio access networks, to access the packet-based services. Some types of networks require enormous scale. Examples include mesh networks of sensors or motes, internet of things (IoT) networks, large service provider access networks using small cells, WiFi-mesh networks, mobile ad-hoc networks (MANET), etc.

Networks typically make use of a host of communication equipment and technologies. It can be a challenge to make these networks robust, economically viable and profitable for the operators. The network elements may potentially be deployed in the thousands or hundreds of thousands.

Each service provider network typically provides an extensive access network infrastructure to provide packet-based data services to the offered services. The access network typically includes a vast collection of access devices and high-speed edge routers interconnected by communication links. These devices may execute various protocols and exchange signaling messages to anchor and manage subscriber sessions and communication flows associated with the subscribers.

SUMMARY

In general, a mesh network is described in which a centralized controller facilitates seamless end-to-end data forwarding from a core-facing edge of the mesh network through mesh nodes located proximate to subscriber devices. The controller provides a central point for configuring the mesh nodes of the mesh network to provide transport services to transport traffic as needed between mesh nodes. In some examples, the mesh nodes may be wireless mesh nodes and/or wired mesh nodes.

The mesh nodes can be configured by the centralized controller to forward traffic along transport data channels defined within the wireless mesh network. Mesh nodes at the borders of the mesh network can operate as endpoints for the data channels to map subscriber traffic into and out of the data channels. In this way, the controller provides a centralized, cloud-based control plane to configure the mesh nodes to provide transport data channels between edge nodes and the mesh nodes, such as for transport of subscriber traffic.

Each mesh node may provide minimal control plane function and essentially operate as low-cost, slave devices to the centralized controller. As such, the mesh nodes may be lower cost and have less management complexity than high-end devices with more complex control-plane functions.

Further, a Cloud Control Protocol (CCP) is described which the mesh nodes can use to automatically discover neighboring nodes and automatically connect to the centralized controller. As described, CCP simplifies topology discovery and path provisioning process within the mesh network and provides a simple, highly available, scalable protocol for use within the mesh network even though the mesh nodes provide little to no control plane functionality.

In one example, a system includes a mesh network comprising a plurality of mesh nodes, wherein each of the plurality of mesh nodes is configured to communicate with one or more subscriber devices, one or more edge nodes to couple the mesh network to a core network, and a centralized controller in communication with the plurality of mesh nodes and edge nodes. The centralized controller includes a topology module that executes a control protocol to receive topology information for the mesh network from the plurality of mesh nodes; and a path computation module (PCM) that computes forwarding information for one or more data channels based at least in part on the topology information, wherein the data channels are for transporting network packets to and from the subscriber devices via the mesh nodes. Each of the mesh nodes operates a reduced control plane without execution of a layer three (L3) routing protocol that maintains routing information for the mesh network and generates forwarding information for the respective mesh node. The centralized controller outputs one or more messages to the mesh nodes to communicate and install within each of the mesh nodes the forwarding information for the one or more data channels.

In a further example, a method is described for configuring a mesh network having a plurality of mesh nodes to transport network packets between mesh nodes and a plurality of edge nodes. The method includes, by a centralized controller of the mesh network, receiving topology information from the plurality of mesh nodes and a plurality of edge nodes, and by a path computation module (PCM) of the centralized controller of the mesh network, computing forwarding information for one or more transport data channels based at least in part on the topology information, wherein the data channels are for transporting network packets between the mesh nodes and the edge nodes. The method further includes outputting, with the centralized controller of the network, one or more messages to communicate and install within each of the mesh nodes, the forwarding information for establishing the one or more data channels, wherein each of the mesh nodes operates a reduced control plane without execution of a layer three (L3) routing protocol that maintains routing information for the mesh network and generates forwarding information for the mesh nodes. The method also includes receiving the network packets associated with a plurality of subscriber devices, and forwarding, with the plurality of mesh nodes, the network packets along the data channels between the mesh nodes and the edge nodes.

In a further example, a system includes a mesh network comprising a plurality of mesh nodes each configured to communicate with one or more subscriber devices; and centralized controller in communication with the plurality of mesh nodes and edge nodes. Each of the mesh nodes forwards one or more Discover messages to neighboring mesh nodes are positioned along paths toward the centralized controller, wherein each of the Discover messages specifies an intermediate node list that specifies layer two addresses and interfaces for the mesh nodes that the respective Discover message traversed from an originating one of the mesh nodes. The centralized controller is configured to, upon the centralized controller receiving the Discover messages, establish a Source Routed Tunnel (SRT) control channel with each of the mesh nodes based on the intermediate node lists specified by the Discover messages. The centralized controller outputs one or more messages to one or more of the mesh nodes via the SRT control channel to perform one or more control functions on behalf of the mesh nodes.

The techniques described herein may provide one or more advantages. For example, the techniques may allow for reducing total operating cost through use of centralized control and use of nodes that are easy to manage and have no persistent configuration. As described herein, in some examples the techniques may be used within wireless mesh networks to unify disparate wireless-enabled devices into a single service environment for business, residential and mobile applications. Moreover, the techniques may allow a mesh network to easily scale with the number of subscriber devices. For example, ease of scaling may be achieved by limiting the size of data channel state data structures on nodes in the mesh network, and in some examples also limiting each node's awareness of other nodes to only its direct neighbors.

The details of one or more examples are set forth in the accompanying drawings and the description below. Other features, objects, and advantages will be apparent from the description and drawings, and from the claims.

BRIEF DESCRIPTION OF DRAWINGS

FIG. 11 is a block diagram illustrating an example Discover message in accordance with the techniques of this disclosure.

FIG. 12 is a block diagram illustrating an example Neighbor Node List element of the Discover message in further detail, according to one example.

FIG. 18 is a block diagram illustrating an example FIB Entry of FIB config message in further detail, according to one example.

FIG. 19 is a block diagram illustrating an example FIB Config Reply Message in accordance with the techniques of this disclosure.

FIG. 20 is a block diagram illustrating an example FIB Parse Status Entry of FIB Config Reply Message in further detail, according to one example.

DETAILED DESCRIPTION

Figure 1:
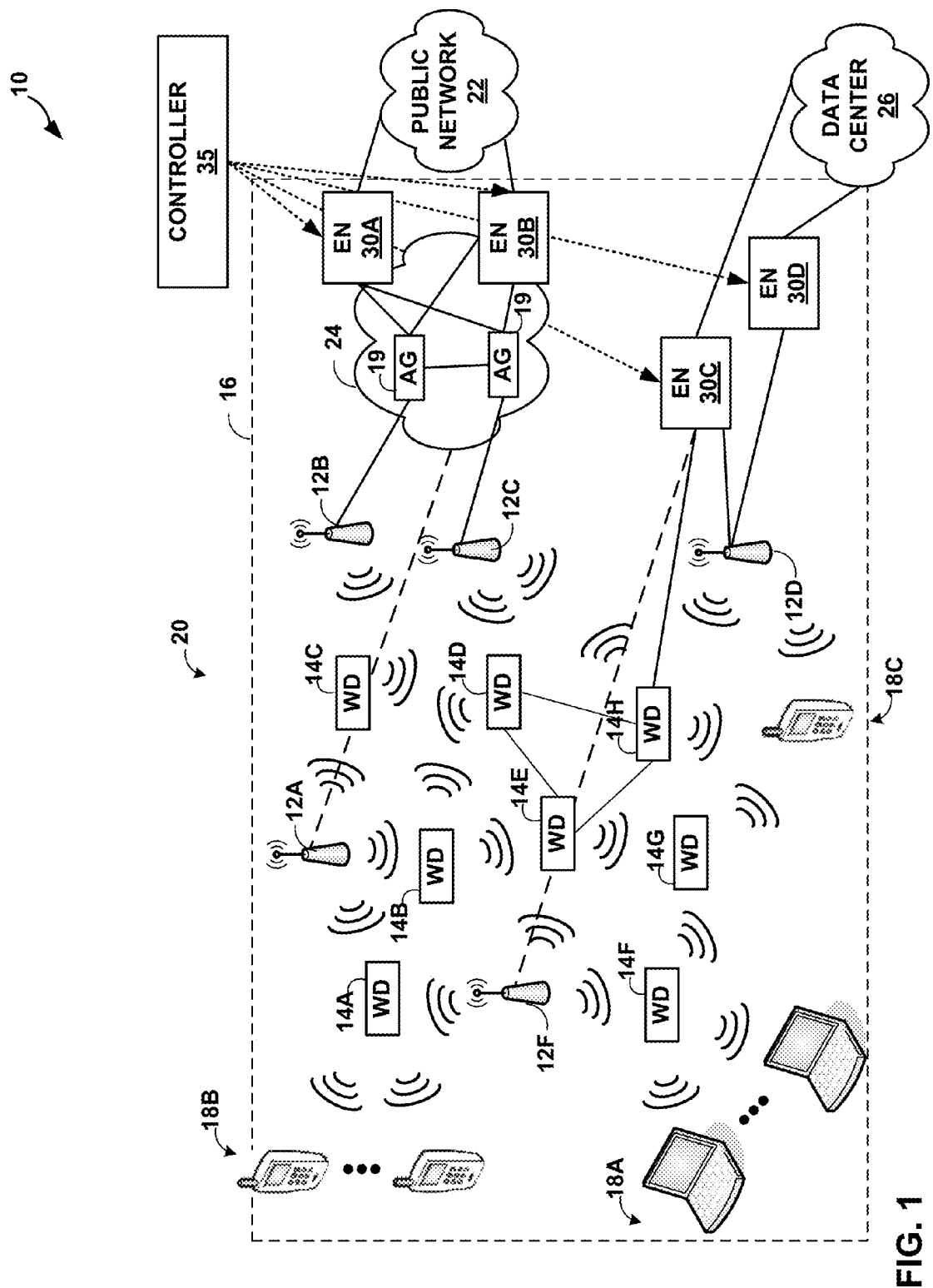
FIG. 1 is a block diagram illustrating an example network system in accordance with techniques described herein.

FIG. 1 is a block diagram illustrating an example network system 10 in accordance with techniques described herein. As shown in the example of FIG. 1, network system 10 includes a mesh network 20 coupled to a public network 22. In this example, network 20 is a large mesh network with many simple nodes, including wireless access points (WAPs) 12A-12F ("WAPs 12") and wired and/or wireless devices (WDs) 14A-14H ("WDs 14"). In general, dashed lines or arcs are used in FIG. 1 to illustrate wireless communications and solid lines are used to illustrate wired connections. Mesh nodes of mesh network 20, that is, any of WAPs 12 and WDs 14, and even one or more of computing devices 18, may be capable of supporting one or more subscriber devices. A subscriber device is an endpoint device of a data channel, such as a data channel that provides connectivity to public network 22 or data center 26. WDs 14 may be viewed as "simple" nodes in that the devices typically have limited computing resources, For example, as further illustrated below, WDs 14 may be sensors, household appliances, consumer-oriented devices and the like, and in many cases may have small microprocessor capabilities, such as 4- or 8-bit microcontrollers, and limited amounts of memory or other computing resources.

In some examples, mesh network 20 may be a network such as a wireless sensor network (WSN) in which WDs 14 are distributed remote sensing devices including or connected to sensors to monitor physical or environmental conditions, such as temperature, sound, pressure, or others. For example, WDs 14 may be wireless-enabled sensors for forest fire detection, air pollution monitoring, landslide detection, water quality monitoring, natural disaster prevention, machine health monitoring, structural health monitoring, or other types of sensing or monitoring.

In some examples, mesh network 20 may be an Internet of Things (IoT) network in which WDs 14 are various items, communicating wirelessly via WAPs 12 or via one or more wired connections. For example, WDs 14 may be wireless-enabled household appliances. In some examples, WDs 14 may be wired mesh nodes connected via one or more wired connections, such as an Ethernet connection. In other examples, mesh network 20 may operate as a private network that provides packet-based network services to computing devices 18A-18C ("computing devices 18"), such as a service provider access network using small cells. In some aspects, mesh network 20 may be a WiFi mesh network, or a mobile ad-hoc network (MANET). In any of the above examples, wireless mesh nodes of mesh network 20 devices could be communicating using any of a variety of wireless protocols, such as Bluetooth, a WiFi protocol, or Zigbee, for example. Although some aspects are described herein for purposes of example with respect to wireless mesh networks, the techniques of this disclosure are equally applicable to wired mesh networks in which the mesh nodes are connected to one another by physical wired connections, e.g., Ethernet connections. For example, mesh nodes (e.g., WDs 14 and WAPs 12) can include one or more of wired mesh nodes that communicate via a wired connection, wireless mesh nodes that communicate via wireless communications, and mesh nodes that communicate via both wired and wireless connections.

Computing devices 18 may be, for example, personal computers, laptop computers or other types of computing device associated with subscribers. Computing devices 18 may comprise, for example, mobile telephones, laptop or desktop computers having, e.g., a 3G wireless card, wireless-capable netbooks, tablet devices, video game devices, pagers, smart phones, personal data assistants (PDAs) or the like. Each of computing devices 18 may run a variety of software applications, such as word processing and other office support software, web browsing software, software to support voice calls, video games, videoconferencing, and email, among others. One or more of computing devices 18 may be mesh nodes within mesh network 20, in the sense that the computing devices 18 can serve as an intermediate hop along a data channel to a subscriber device. Any of WDs 14 or computing devices 18 can be subscriber devices, i.e., endpoints to data channels via mesh network 20.

In the example of FIG. 1, network system 10 includes a centralized controller 35 that provides complete control-plane functionality for mesh network 20. As described herein, controller 35 may facilitate end-to-end data forwarding from a core-facing edge of the mesh network 20 through wireless access points 12 and WDs 14 located proximate to computing devices 18. The controller 35 provides a central point for configuring the wireless access points 12 and WDs 14 of the mesh network to provide transport services to transport traffic as needed between WDs 14.

Although described for purposes of example as including both WAPs 12 and WDs 14, mesh network 20 may in some examples include only WAPs 12 that communicate with computing devices 18. In some examples, WAPs 12 and WDs 14 may be referred to herein generally as "wireless devices," "wireless nodes," "wireless mesh nodes," "wired mesh nodes," or simply "mesh nodes."

Mesh network 20 and aggregation network 24 can provide transport services for network traffic associated with subscribers 18. Aggregation network 24 may, in some examples, include one or more aggregation nodes ("AG") 19, such as internal routers and switches that provide transport services between WDs 14 and edge nodes (ENs) 30A-30D ("ENs 30"). In some examples, after authentication and establishment of network access through network 20, any one of computing devices 18 may begin exchanging data packets with public network 22 with such packets traversing network 20 and AGs 19. Although not shown, aggregation network 24 may include other devices to provide security services, load balancing, billing, deep-packet inspection (DPI), and other services for mobile traffic traversing aggregation network 24.

As described herein, controller 35 operates to provide a central configuration point for configuring AGs 19 of aggregation network 24, and WAPs and WDs of mesh network 20, such as to provide transport services to transport traffic between devices of mesh network 20 and edge nodes 30. AGs 19 may, in some examples, operate as label switched routers (LSRs) that forward traffic along transport label switched paths (LSPs) defined within aggregation network 24. Edge nodes 30 may operate as endpoints for the LSPs to map subscriber traffic into and out of the LSPs. For example, edge nodes 30 may map network services to individual LSPs within aggregation network 24.

Mesh nodes within mesh network 20 (e.g., WAPs 12 and/or WDs 14) can be simple and inexpensive by design, with a minimal control plane and basic data forwarding support. The mesh nodes can support plug-and-play deployment, control channel establishment to controller 35, and participate in auto-discovery of topology, as described in further detail herein. Other higher level control functionality is performed on controller 35, which configures all the functions on the mesh nodes. The simplicity of processing required in the WDs and the use of standard forwarding mechanisms is expected to reduce the cost of hardware required in the nodes. Devices in network system 10 may therefore cost less and have a lower management complexity than conventional high-end routers typically used within a wired or wireless mesh network and an aggregation network since such devices often provide complex control-plane functions. For example, when the software running on the mesh node has very few features, software upgrades may rarely be needed. This, coupled with centralized management and trouble-shooting, can, in some examples, reduce the overall total cost of ownership associated with mesh network 20.

The architecture described herein uses a control protocol referred to herein a Cloud Control Protocol (CCP) to allow the mesh nodes in network system 10 to be as simple as possible with minimal control functionality, while allowing the controller 35 to perform the complex control functions. Controller 35 and the mesh nodes operate in accordance with the CCP to set up a Source Routed Tunnel (SRT) control channel between controller 35 and one or more of the mesh nodes. Controller 35 can output one or more messages to one or more of the mesh nodes via the SRT control channel to perform one or more control functions on behalf of the mesh nodes. For example, the one or more control functions can include one or more of configuration of the mesh nodes, monitoring status of the mesh nodes, image download to the mesh nodes, gathering traffic statistics about network traffic at the mesh node, gathering information about local load conditions on the mesh nodes, gathering information about error rates on the mesh nodes, or other control functions. In some examples, the one or more control functions include computing forwarding information for one or more data channels based at least in part on topology information received from the one or more mesh nodes via the discover messages, wherein the data channels are for transporting network packets to and from subscriber devices via the mesh nodes.

As shown in FIG. 1, mesh network 20 is comprised of a collection of mesh nodes 12, 14, and wired or wireless links between the mesh nodes. WAPs 12 may have a wired connection to AGs 19 and/or ENs 30. WAPs 12 may be 802.11 access points running an 802.11 protocol, for example.

In some examples, WAPs 12 and/or WDs 14 may be access nodes that provide Ethernet services to an Endpoint, e.g., one of subscribers 18. Such services may be subjected to per packet policy and Class of Service (CoS) based policing (uplink only). The access node maps the port through which an Endpoint is connected to a data channel that carries the Endpoint's traffic to/from the network service located at an Edge Node 30. An access node may also locally switch traffic directly between two ports or directly between itself and another access node. WAPs 12 and/or WDs 14 may be configuration-less at boot+-time and acquires its entire configuration from the controller 35. WAPs 12 and/or WDs 14 may be use CCP to discover its neighbors and set up a control channel to the Controller 35.

ENs 30 map data channels to network services. ENs 30 may also apply downlink policy and CoS policing to the traffic admitted to the data channel. Network services are configured and managed on the ENs 30. In some examples, network system 10 may include more than one controller 35. ENs 30 may be configured and connected directly to some management network where controller(s) 35 reside. The ENs may be configured with the IP Address of the controller(s) 35. In the example of FIG. 1, network system 10 includes multiple edge nodes 30 that provide multiple exit points to mesh network 20. For example, ENs 30A, 30B provide exit points to public network 22, and ENs 30C, 30D provide exit points to data center 26.

An Edge Node 30 discovers its neighbors via CCP on the interfaces to which CCP is configured. Since the EN 30 is connected to the Controller 35 via the Internet Protocol (IP) management network, the EN 30 need not discover a control channel. Rather, EN 30 directly uses the configured IP addresses to communicate with the Controller 35. The EN 30 also has the responsibility to indicate its Network Services to the Controller 35. These network services may then be used by the Controller 35 to identify which ENs 30 host which services when sessions are to be admitted into the network.

AGs 19 do not have to perform any access or edge functions. AGs 19 collectively serve as a "switching fabric" over which the data services are delivered to the Endpoints. The AG 19 uses CCP for neighbor discovery and control channel establishment. Note that a node can be both an access or mesh node (if it has endpoints connected to it) as well as an AG to other access or mesh nodes whose traffic is transiting through it.

In wireless networks, many links share the same set of resources, e.g., the same RF spectrum. For example, when WD 14B sends a packet to WD 14A, WD 14B might not be able to simultaneously send a packet to WD 14C, because WD 14B is using the same radio for both. Bandwidth across a wireless "link" may be variable over time, for example due to environmental factors. Error rates are much higher in wireless links than wired links, so the wireless protocols use the error rates to determine how fast they can transmit. In some examples, wireless nodes can include within discover messages a generic metric that tries to capture all these features. Link attributes can be updated continuously, periodically, in real time, as things change.

In the example of a wireless mesh of access points using WiFi, location services can run on top of a northbound API to locate where the user is relative to an access point. The northbound API gives information about different attributes from the network, and simplify for controller 35 what is needed by the application. Controller 35 can receive policies from applications via the northbound interface.

As further described below, controller 35 includes a path computation module (PCM) that handles topology computation and path provisioning for the whole of mesh network 20. That is, the PCM of controller 35 processes topology information for mesh network 20, performs path computation and selection in real-time based on a variety of factors, including current load conditions of subscriber traffic, and provisions the data channels within the aggregation network.

Once controller 35 computes the paths and the detours, the controller 35 configures forwarding information in the ENs 30, AGs 19, WAPs 12 and WDs 14 with the appropriate forwarding information for both upstream and downstream directions, so that traffic forwarding is enabled. In addition to the primary forwarding entries, controller 35 configures the secondary forwarding entries as well so that switchover, in case of link or node failure, can happen without involvement of controller 35.

Once a mesh node has joined the network and is forwarding traffic, it continues to send periodic messages to its neighbors. If a link or node fails, it is discovered via this mechanism. The nodes around the failure each independently figure out this change, and switch the impacted paths to their pre-configured detours. While the data-plane continues its operation uninterrupted, each node exchanges messages with its neighbors to check which links and nodes are active. Each node then reports this information via a Hello message, which is sent to the neighboring node with the shortest path to the Controller 35. The latter forwards this message to the Controller 35, which is thus notified of the topology change. The Controller 35 re-computes the topology and the paths, and configures the required changes, if any, into the relevant nodes. The path is repaired in a make before break fashion at the node adjacent to the failure. Then the old portion of the path is removed. Note that if a detour becomes unused, it should not be deleted until all the paths that rely on it have been re-assigned.

The Controller 35 computes and configures paths based on the bandwidth required by that path (total of all the traffic carried over it). If for some reason, a link capacity on that path changes (e.g., fading due to rain on a wireless backhaul link), this information is conveyed to the Controller 35, which then adapts to changes in link capacity and re-computes an alternate path for the traffic and re-configures the impacted nodes to switch the traffic over in a make-before-break fashion.

The CCP boundary 16 illustrates the region in which devices communicate using CCP (with the addition of controller 35). In one example, CCP supports automatic discovery of neighboring WDs 14 and WAPs 12 and provides a mechanism by which any WDs 14 and WAPs 12 can describe its neighboring nodes to controller 35. For example, CCP provides an elegant mechanism for establishing a control channel by which controller 35 configures and controls WDs 14 and WAPs 12 within mesh network 20. Moreover, CCP allows the control channel to be established independent of the data plane of mesh network 20 being operational yet does not require a parallel control network. Further, CCP provides mechanisms for programming forwarding information into WAPs 12, WDs 14, and AGs 19 data planes, detour next-hops, per CoS policers and per-interface packet scheduling.

In some examples, mesh network 20 may be a radio access network with an access node that provide computing devices 18 with access to aggregation network 24 via radio signals. For example, computing devices 18 may be connected to one or more wireless radios or base stations (not shown) to wirelessly exchange packetized data with computing devices 18, such as by converting modulated optical signals to electrical signals for transmission to computing devices 18 via wireless signals.

Aggregation network 24 provides session management, mobility management, and transport services to support access, by computing devices 18, to public network 22. Edge node 30 provides an anchor point of active sessions for computing devices 18. Edge node 30 may maintain session data and operate as a termination point for communication sessions established with computing devices 18 that are currently accessing packet-based services of public network 22 via aggregation network 24. Examples of a high-end mobile gateway device that manages subscriber sessions for mobile devices are described in U.S. patent application Ser. No. 13/248,834, entitled MOBILE GATEWAY HAVING REDUCED FORWARDING STATE FOR ANCHORING MOBILE SUBSCRIBERS," the entire content of which is incorporated herein by reference.

In some examples, wireless interfaces of WDs 14 and/or WAPs 12 provide an execution environment for a plurality of schedulers, one for each port coupled to the wireless interface, i.e., one for each radio channel. Each scheduler dynamically services data transmission requests for the set of devices communicating at the given channel, thereby allowing controller 35 to dynamically schedule data transmissions so as to utilize otherwise unused communication bandwidth.

In some examples, mesh network 20 may comprise an optical access network. For example, one or more of WDs 14 may comprise an optical line terminal (OLT) connected to one or more endpoints or optical network units (ONUs) via optical fiber cables. In this case, WDs 14 may convert electrical signals from aggregation network 24 to optical signals using an optical emitter, i.e., a laser, and a modulator. WDs 14 then transmits the modulated optical signals over one or more optical fiber cables to customer premises equipment (CPEs), which act as termination points of the optical access network. As one example, WDs 14 converts received modulated optical signals to electrical signals for transmission to computing devices 18A over copper cables. As one example, WDs 14 or WAPs 12 may comprise a switch located in a neighborhood or an office or apartment complex capable of providing access to a plurality of computing devices 18A. In other examples, such as fiber-to-the-home (FTTH), WDs 14 or WAPs 12 may comprise a gateway located directly at a single-family premise or at an individual business capable of providing access to the one or more computing devices 18A at the premise. In the case of a radio access network, the EPs may be connected to wireless radios or base stations and convert the modulated optical signals to electrical signals for transmission to computing devices 18B via wireless signals.

In one example, WDs 14 or WAPs 12 may provide optical interfaces that are each capable of optically communicating with a plurality of different endpoints through a common optical interface. WDs 14 or WAPs 12 may, for example, communicate with endpoints through a passive optical network using wave division multiplexing. Further, endpoints may be low-cost, optical emitter-free endpoints that incorporate a specialized optical interface that utilizes reflective optics for upstream communications. In this way, multiple endpoints are able to achieve bi-directional communication with WDs 14 or WAPs 12 through a single optical interface of the access router even though the EPs are optical emitter (e.g., laser) free. In some examples, mesh network 20 may further utilize optical splitters (not shown) for the optical communications associated with each of the different wavelengths provided by the optical interfaces of WDs 14 or WAPs 12. Further example details of an optical access network that uses wave division multiplexing and dynamic scheduling in conjunction with emitter-free EPs can be found in U.S. Provisional Patent Application "OPTICAL ACCESS NETWORK HAVING EMITTER-FREE CUSTOMER PREMISE EQUIPMENT AND ADAPTIVE COMMUNICATION SCHEDULING," filed Dec. 16, 2012, the entire contents of which are incorporated herein by reference.

In some examples, wired interfaces of WDs 14 provide an execution environment for a plurality of schedulers, one for each virtual port on a shared wired medium, e.g. Passive Optical Network (PON). Each scheduler dynamically services data transmission requests for the set of devices communicating on the shared medium, thereby allowing controller 35 to dynamically schedule data transmissions so as to utilize otherwise unused communication bandwidth.

Further examples of a central controller are described in U.S. Pat. No. 8,693,374, issued Apr. 8, 2014, entitled "CENTRALIZED CONTROL OF AN AGGREGATION NETWORK WITH A REDUCED CONTROL PLANE;" and U.S. Pat. No. 8,711,855, issued Apr. 29, 2014, entitled "TOPOLOGY DISCOVERY, CONTROL CHANNEL ESTABLISHMENT, AND DATAPATH PROVISIONING WITHIN AN AGGREGATION NETWORK WITH CENTRALIZED CONTROL," the entire contents of each of which are incorporated by reference herein.

Edge node 30 provides an anchor point of active sessions for computing devices 18A. In this sense, edge node 30 may maintain session data and operate as a termination point for communication sessions established with computing devices 18A that are currently accessing packet-based services of public network 22 via aggregation network 24. In one example instance, Edge Nodes 30 terminate the discovery process and forwards all Discover packets received to the CCP controller 35. The edge nodes 30 are also connected to existing network(s) 22, 26 (e.g., core networks), and may provide a connection for receiving network services from existing networks, for example. Example operation of one implementation of CCP is as follows. Mesh nodes discover their neighbors by sending Hello messages on all of their CCP links. The examples described below with reference generally to "nodes" are applicable to both WAPs 14 and WDs 14. The links may be any type of computer network transmission medium. For instance, a link may be a fiber optic cable, an Ethernet cable, a wireless connection, and so on. When a Hello Reply is received, a neighbor is discovered. Once a neighbor is discovered on a link, the link is declared as active and it is added to a "neighbor set" for that node. A neighbor set is defined herein as a set specifying each of the active interfaces and an identifier of the neighbor reachable by the interface. The neighbor set is then sent across all active links via a Discover packet.

In one example, a Discover packet contains a generation number, the neighbor list and an intermediate node list that is initially empty. The Discover packet is sent out all active links. The receiver of the Discover packet first checks to see if the receiver is on the intermediate node list. If the receiver is on the list this implies that the packet has visited the node before, and the packet is dropped. If the receiver of the Discover packet is not on the list, the node adds itself to the list and then floods the packet out all active links other than its ingress link.

In some examples, the Edge Nodes 30 do not flood Discover packets out of their active links. Instead, edge nodes 30 send Discover packets directly to the controller 35. When the controller 35 receives the Discover packet, controller 35 compares the generation number against the current generation number received for that node. If the generation number is newer, controller 35 updates the neighbor list and the path to the node. The path to the node is computed by reversing the path the Discover packet took as recorded in the intermediate node list. This path is referred to as a Source Routed Tunnel (SRT) control channel and is used for the duration of this generation number for all CCP communications with the node.

The controller 35 responds to the first Discover packet of a given generation number by issuing a Flood Reply via the SRT to the node. When a node receives a Flood Reply which carries the Source Route List, it now has an SRT back to the controller 35. At this point the controller 35 and the node are in sync with respect the node's neighbor list and the SRT used to send additional CCP control messages. The node sends Keepalive packets to the controller 35 to ensure the state of the SRT. The controller 35 responds with a Keepalive Reply. If no Keepalive Reply occurs, the node generates a new Discover packet with a new generation number to force the acceptance at controller 35 of a new SRT. The SRT control channel may now be used to program the forwarding plane of node via other control messages.

In one example, the CCP may include features such as being simple, highly available, and scalable. The CCP can support neighbor discovery with fast keep-alives. CCP provides a mechanism whereby a node can describe its neighbors to a controller. CCP allows for Establishing a Control Channel independent of the data plane being operational yet does not require a parallel control network. CCP provides FIB programming facilities including detour next-hops, per CoS policers and per-interface packet scheduling. CCP runs over the standard Ethernet MAC or simulations thereof. HELLO, HELLO REPLY messages may be exchanged over Ethernet interfaces to discover and maintain neighbor state. Messages include the node specific interface index so that the global topology may be understood.

CCP may have one or more advantages relative to other protocols: such as automatic Control Channel establishment independent of data plane; there is no need to provide a parallel control network; minimal Control plane complexity versus IGPs; only maintains local neighbor state and directed FIB state; better control plane scaling versus IGPs; the entire routing table is not sent to all nodes; convergence issues are reduced via the controller; can avoid soft state, rollback issues versus RSVP; minimal Forwarding plane functionality; detour path support; simpler switching silicon; Plug and Play, no on-box configuration.

The techniques described herein may provide certain advantages. For example, the techniques may allow a service provider to achieve a reduction in total operating cost through use of centralized controller 35 in conjunction with high-speed aggregation nodes 19 that are easy to manage and have no persistent configuration. Controller 35 provides a network operator with a single touch-point into the network to monitor and troubleshoot without having to query multiple nodes in the network. Moreover, the techniques may be utilized within aggregation networks to unify disparate edge networks into a single service delivery platform for business, residential and mobile applications. Moreover, the techniques can provide a mesh network architected to easily scale as the number of computing devices 18 increases.

Figure 2:
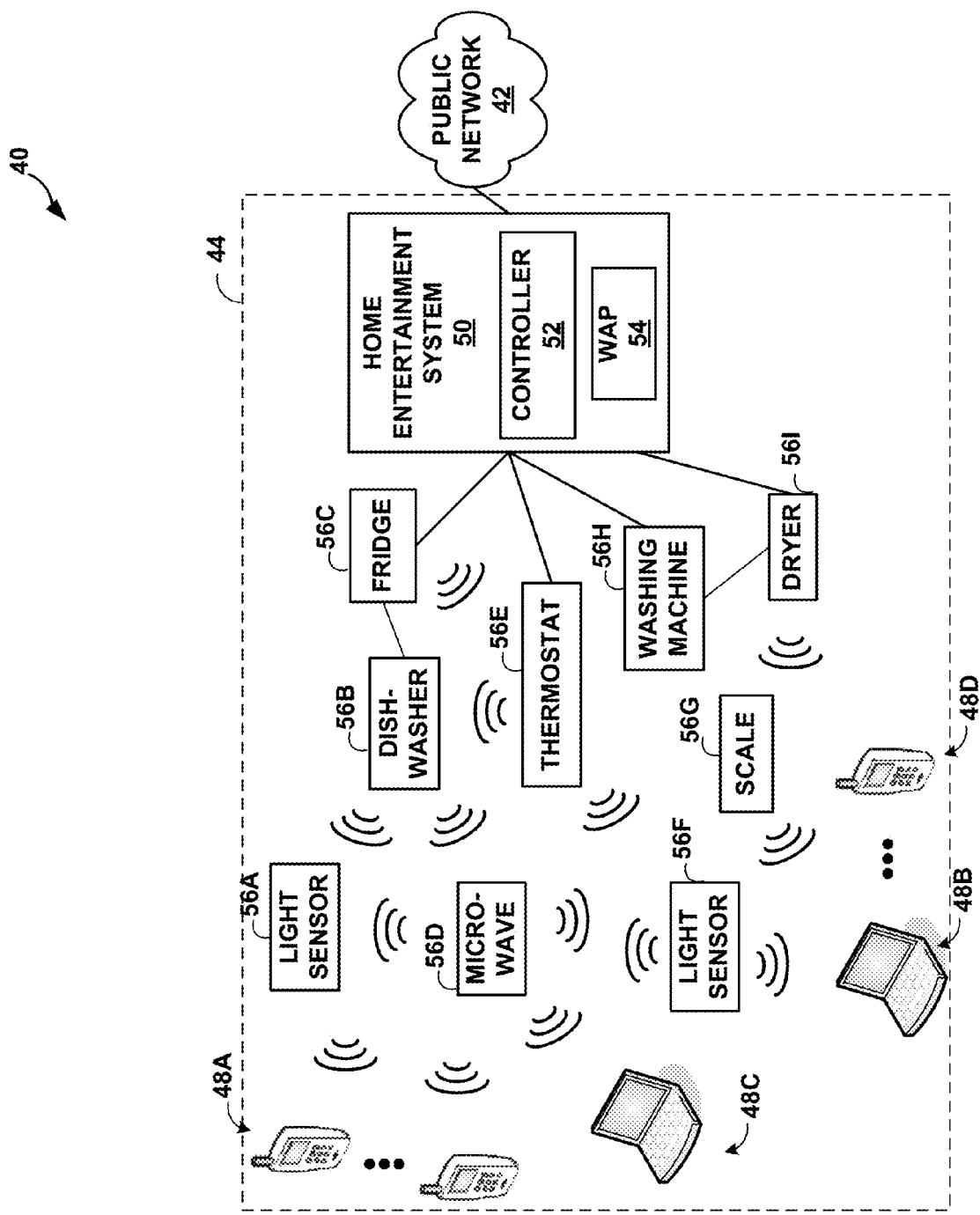
FIG. 2 is a block diagram illustrating another example network system in accordance with techniques described herein.

FIG. 2 is a block diagram illustrating an example network system 40 in which devices are configured in accordance with the techniques of this disclosure. FIG. 2 shows an example of a home environment that includes a home entertainment system 50 having an integrated controller 52 and WAP 54. Home entertainment system 50 may serve as an edge node, and can provide a connection (e.g., Ethernet connection) to a public network 42, such as the Internet. Network system 40 includes several wireless-enabled household devices and appliances, including, for example, light sensors, a microwave, a dishwasher, a refrigerator ("fridge"), washing machine, dryer, scale, and thermostat. The wireless-enabled devices may be collectively referred to as wireless devices 56A-56I ("wireless devices 56"), although one or more of devices 56 may be wired devices. In some examples, wireless devices 56 may communicate with one another by wireless communication (e.g., Bluetooth, WiFi, Zigbee) and form a wireless mesh network.

Network system 40 includes computing devices (e.g., computing devices 48A-48D ("computing devices 48")), which may be, for example, personal computers, laptop computers, tablets, smart-phones or other types of computing device associated with subscribers. Computing devices 1848 may comprise, for example, mobile telephones, laptop or desktop computers having, e.g., a 3G wireless card, wireless-capable netbooks, tablet devices, video game devices, pagers, smart phones, personal data assistants (PDAs) or the like. Each of computing devices 48 may run a variety of software applications, such as word processing and other office support software, web browsing software, software to support voice calls, video games, videoconferencing, and email, among others.

CCP boundary 44 illustrates the logical region in which devices communicate using CCP. In one example, the home entertainment system 50 runs the controller 52 (e.g., as a virtual machine running on a CPU of home entertainment system 50), and controller 52 can set up paths within the mesh network. In one example, home entertainment system 50 may be a Playstation device. When a new device comes into the home within range of home entertainment system 50, the device can communicate its wireless link information up to controller 52 via discover messages in the wireless mesh network as described herein, and controller 52 of home entertainment system 50 can set up a data channel for the new device.

Controller 52 learns topology of the wireless mesh via Discover messages. The discover messages can include information such as capacity of the links, what the technology is, how much bandwidth is required by the application the wireless device needs to run over the link, and controller 52 determines the optimal path (based on some metrics/constraints per above) and then configures the wireless device in its native data plane protocol. Controller 52 configures data plane tables to set up forwarding paths as needed. Controller 52 can establish and install state for primary paths and backup paths in the data plane in the first case. If a node in the middle dies, the surrounding nodes figure it out and communicate to controller 52, and controller 52 computes alternate paths for the mesh. In the meantime, the remaining nodes can use the backup paths that were installed; in this manner redundancy is built in to the system. For example, if a person suddenly happens to be standing in the path of a wireless link, such that traffic would need to be routed around that link, the alternate path can be computed by the controller 52 based on its topology information received from the wireless devices via Discover messages, and provided to the wireless devices.

Figure 3:
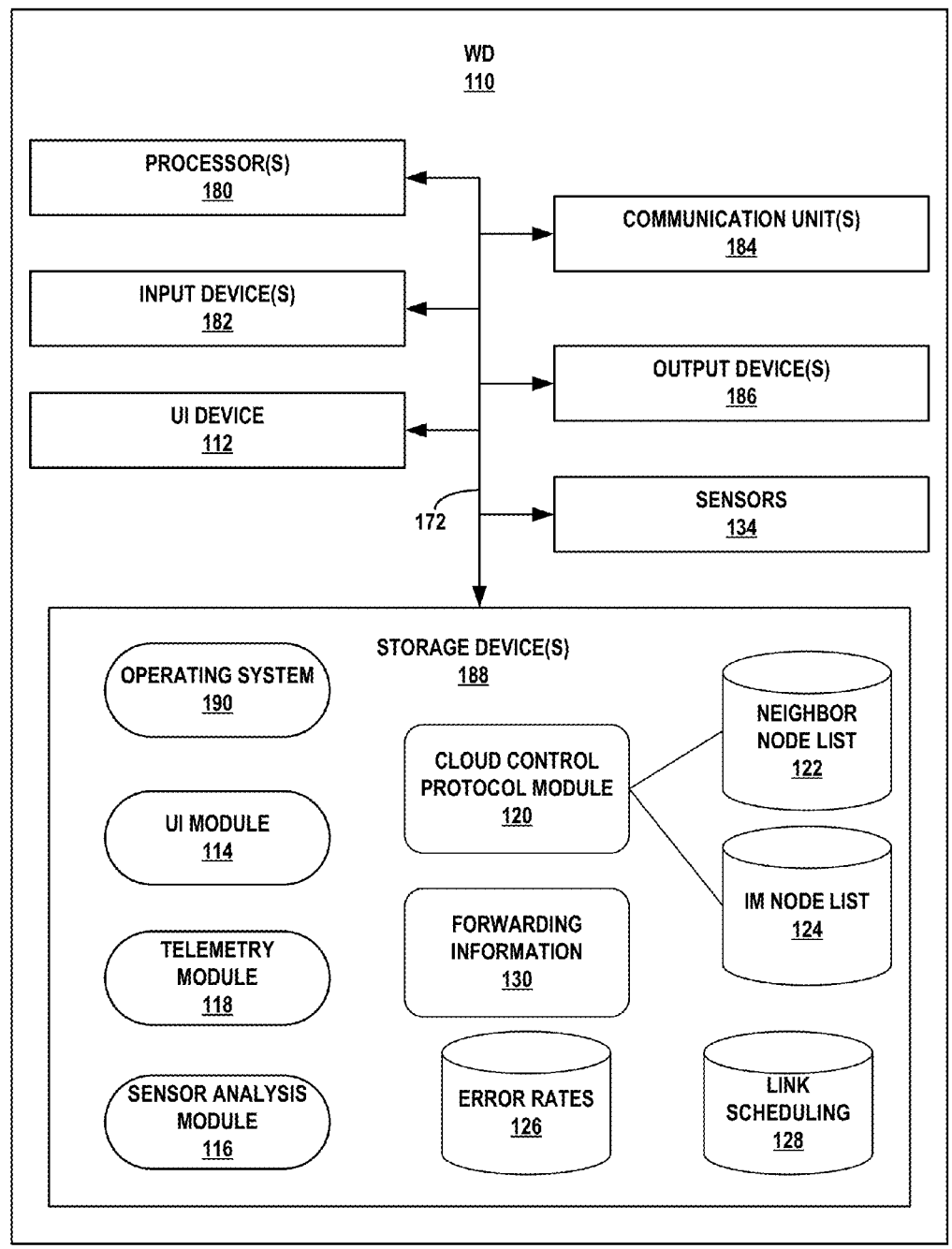
FIG. 3 is a block diagram illustrating an example network device in accordance with this disclosure.

FIG. 3 is a block diagram illustrating an example network device in accordance with this disclosure. Wireless/wired device 110 (WD 110) may, for example, represent any of WAPs 12 or WDs 14 of FIG. 1. WD 110 may be, for example, a wired mesh node that communicates via a wired connection, a wireless mesh node that communicates via wireless communications, or a mesh node that communicates via both wired and wireless connections. As shown in the example of FIG. 3, WD 110 includes one or more processors 180, one or more input devices 182, one or more communication units 184, one or more output devices 186, one or more storage devices 188, user interface (UI) device 112, and sensors 134. In the example of FIG. 3, WD 110 further includes UI module 114, sensor analysis module 116, telemetry module 118, and operating system 190, which are executable by one or more processors 180. Each of components 180, 182, 184, 186, 112, 134, and 188 are coupled (physically, communicatively, and/or operatively) using communication channels 172 for inter-component communications. In some examples, communication channels 172 may include a system bus, a network connection, an inter-process communication data structure, or any other method for communicating data. UI module 114, sensor analysis module 116, telemetry module 118, and operating system 190 may also communicate information with one another, as well as with other components in WD 110.

One or more processors 180, in one example, are configured to implement functionality and/or process instructions for execution within WD 110. For example, processors 180 may be capable of processing instructions stored by storage device 68. Examples of one or more processors 180 can include any one or more of a microprocessor, a controller, a DSP, an ASIC, a FPGA, or equivalent discrete or integrated logic circuitry.

One or more storage devices 188 may be configured to store information within WD 110 during operation. Storage devices 188, in some examples, include a computer-readable storage medium or computer-readable storage device. In some examples, storage devices 188 include a temporary memory, meaning that a primary purpose of storage device 68 is not long-term storage. Storage devices 188, in some examples, include a volatile memory, meaning that storage device 68 does not maintain stored contents when power is not provided to storage device 68. Examples of volatile memories include random access memories (RAM), dynamic random access memories (DRAM), static random access memories (SRAM), and other forms of volatile memories known in the art. In some examples, storage devices 188 are used to store program instructions for execution by processors 180. Storage devices 188, in some examples, are used by software or applications running on WD 110 (e.g., sensor analysis module 116) to temporarily store information during program execution.

In some examples, storage devices 188 may further include one or more storage device 68 configured for longer-term storage of information. In some examples, storage devices 188 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

WD 110, in some examples, also includes one or more communication units 184. WD 110, in one example, utilizes communication unit 64 to communicate with external devices via one or more networks, such as one or more wireless networks. Communication unit 64 may be a network interface card, such as an Ethernet card, an optical transceiver, a radio frequency transceiver, or any other type of device that can send and receive information. Other examples of such network interfaces may include Bluetooth, 3G, and WiFi radios computing devices as well as Universal Serial Bus (USB). In some examples, WD 110 utilizes communication unit 64 to wirelessly communicate with an external device such as mobile computing device 10. Communication units 184 can be controlled by telemetry module 118.

WD 110, in one example, also includes one or more input devices 182. Input device 182, in some examples, is configured to receive input from a user, such as through tactile, audio, or video sources. Examples of input device 182 include a presence-sensitive device, such as a presence-sensitive display, a mouse, a keyboard, a voice responsive system, video camera, microphone or any other type of device for detecting a command from a user. In some examples, a presence-sensitive display includes a touch-sensitive display.

One or more output devices 186 may also be included in WD 110. Output device 186, in some examples, is configured to provide output to a user using tactile, audio, or video stimuli. Output device 186, in one example, includes a presence-sensitive display, a sound card, a video graphics adapter card, or any other type of device for converting a signal into an appropriate form understandable to humans or machines. Additional examples of output device 186 include a speaker, a CRT monitor, a LCD, OLED, or any other type of device that can generate intelligible output to a user. In some examples, UI device 112 may include functionality of one or more of input devices 182 and/or output devices 186.

WD 110 also can include UI device 112. In some examples, UI device 112 is configured to receive tactile, audio, or visual input. In addition to receiving input from a user, UI device 112 can be configured to output content such as a GUI for display at a display device, such as a presence-sensitive display. In some examples, UI device 112 can include a presence-sensitive display that displays a GUI and receives input from a user using capacitive, inductive, and/or optical detection at or near the presence sensitive display. In some examples, UI device 112 is both one of input devices 182 and one of output devices 186.

WD 110 may include operating system 190. Operating system 190, in some examples, controls the operation of components of WD 110. For example, operating system 190, in one example, facilitates the communication of UI module 114 and sensor analysis module 116 with processors 180, communication units 184, storage devices 188, input devices 182, output devices 186, and sensor 134. UI module 114, sensor analysis module 116, telemetry module 118, notification module 76, and vicinity module 74, can each include program instructions and/or data that are executable by WD 110 (e.g., by one or more processors 180). As one example, UI module 114 can include instructions that cause WD 110 to perform one or more of the operations and actions described in the present disclosure.

In examples in which WD 110 is one of WDs 12, WD 110 can include one or more sensors 134. Sensors 134 can be, for example, one or more sensors for forest fire detection, air pollution monitoring, landslide detection, water quality monitoring, natural disaster prevention, machine health monitoring, structural health monitoring, or other types of sensing or monitoring. In some examples, sensors 134 can be configured to generate a signal indicative of the sensor data. Sensor analysis module 116 can then receive the signal indicative of the sensor data.

WD 110 can include additional components that, for clarity, are not shown in FIG. 3. For example, WD 110 can include a battery to provide power to the components of WD 110. Similarly, the components of WD 110 shown in FIG. 3 may not be necessary in every example of WD 110.

WD 110 executes a cloud control protocol (CCP) module 306 that operates in accordance with a cloud control protocol, also referred to herein as a discovery protocol or an open centralized control protocol. In some examples, cloud control protocol module 120 outputs a hello message, e.g., a Cloud Control Protocol (CCP) Hello message, on each interface and/or link. Each of the Hello messages includes an identifier that is unique to WD 110 (e.g., an aggregation node or access node) that sent the hello message and the interface on which the Hello message was sent. In accordance with the protocol, WD 110 also outputs a Hello Reply message on each interface on which a Hello message was received. Cloud control protocol module 120 maintains a neighbor node list 122 that identifies neighboring nodes from which WD 110 received Hello messages and the interfaces on which the Hello messages were received. Although described for purposes of example in terms of "interfaces," and "links," the techniques of this disclosure apply to wireless interfaces, radio channels, and other wireless communication links.

Responsive to receiving CCP Hello Reply messageon a link, WD 110 may in some examples declare the link as an active link and adds the neighboring node to the neighbor node list 122. Cloud control protocol module 120 outputs discover messages that each specify the neighbor node list identifying neighboring nodes and interfaces on which neighboring nodes are reachable from WD 110.

In addition, upon receiving a discover message and determining that the discover message does not include a layer two address for a recipient one of the nodes, cloud control protocol module 120 updates a stored intermediate node list 124 ("IM node list") of the discover message that specifies, for example, layer two addresses and interfaces for the nodes that the discover message traversed from an originating one of the nodes.

Upon updating the discover message, cloud control protocol module 120 forwards the discover messages to the neighboring nodes that are positioned along paths toward a central controller (e.g., controller 35 of FIG. 1), and the centralized controller, upon receiving the discover messages, establishes a Source Routed Tunnel (SRT) control channel with each of the nodes, including WD 110, based on the intermediate node lists specified by the discover messages. WD 110 executes the cloud control protocol module 120 without executing an Interior Gateway Protocol (IGP) within a control plane (not shown) of WD 110.

The centralized controller computes the topology information for the network and computes the forwarding information for the transport data channel(s) in accordance with the neighbor node list within each of the discover messages received from the network.

WD 110 receives, from the controller and via the respective SRT control channels, the pre-computed forwarding information computed by the centralized controller for configuring WD 110 to forward the network packets on the data channels. The pre-computed forwarding information may, in some examples, include directed forwarding information state including information needed for WD 110 to forward packets on a data channel. In some examples, the directed forwarding information state includes policers to police ingress traffic for the data channel according to the computed bandwidth. In some examples, WD 110 maintains link scheduling information 128. WD 110 may maintain information regarding error rates for transmission on wireless links in error rates 126, and may update this information in real time as network conditions change. Error rates may be expressed in a particular time it takes to transfer 100 bytes of data, based on sampled measurements, for example. WD 110 can include information regarding error rates, link scheduling, load conditions for the wireless links, in discover messages sent to the centralized controller. WD 110 can indicate that particular links are shared.

Based on the forwarding information and link information, the centralized controller also computes one or more backup data channels for the network, and outputs one or more messages to WD 110 to communicate and install, within WD 110, forwarding information for the backup data channels. WD 110 stores the forwarding information for the data channels and the backup data channels to forwarding information 130. The messages received from the centralized controller can, in some examples, include directed link scheduling state to install within link scheduling information 128 to indicate how traffic should be schedule on wireless links (e.g., when the links are at full utilization), as computed by the controller. The controller can determine the demand put on the network because it has the end to end path requirements. WD 110 forwards packets based on forwarding information 130 and link scheduling information 128. In response to a network event, forwarding component 304 may re-route at least a portion of the network packets along the backup data channel. The network event may be, for example, a link or node failure. The controller may also compute detour data channels to handle fast reroute for any interior node failure.

In some examples, when forwarding the discover messages, WD 110 modifies the discover messages to include one or more link characteristics associated with the interfaces, and the centralized controller computes the forwarding information for the data channels based at least in part on quality of service (QoS) metrics requested for the data channels and the link characteristics received from the discover messages.

In some examples, WD 110 sends Keepalive packets to the centralized controller network device to ensure a state of the SRT control channel, and, responsive to determining that no Keepalive Reply is received from centralized controller network device within a time period, WD 110 generates a new Discover message with a new generation number to force acceptance at a centralized controller network device of a new SRT control channel.

In this manner, WD 110 has a reduced control plane 303 that does not execute a Multiprotocol Label Switching (MPLS) protocol for allocation and distribution of labels for LSPs and does not execute a routing protocol such as an interior gateway protocol (IGP). Instead, WD 110 executes the cloud control protocol module 120 to receive forwarding information directly from a central controller (e.g., controller 35 of FIG. 1), without requiring conventional forwarding plane signaling. In various examples, the messages exchanged between WD 110 and the centralized controller may conform to any of the message formats described herein.

In one embodiment, WD 110 may comprise one or more dedicated processors, hardware, and/or computer-readable media storing instructions to perform the techniques described herein. The architecture of WD 110 illustrated in FIG. 3 is shown for example purposes only. In other embodiments, WD 110 may be configured in a variety of ways.

Figure 4:
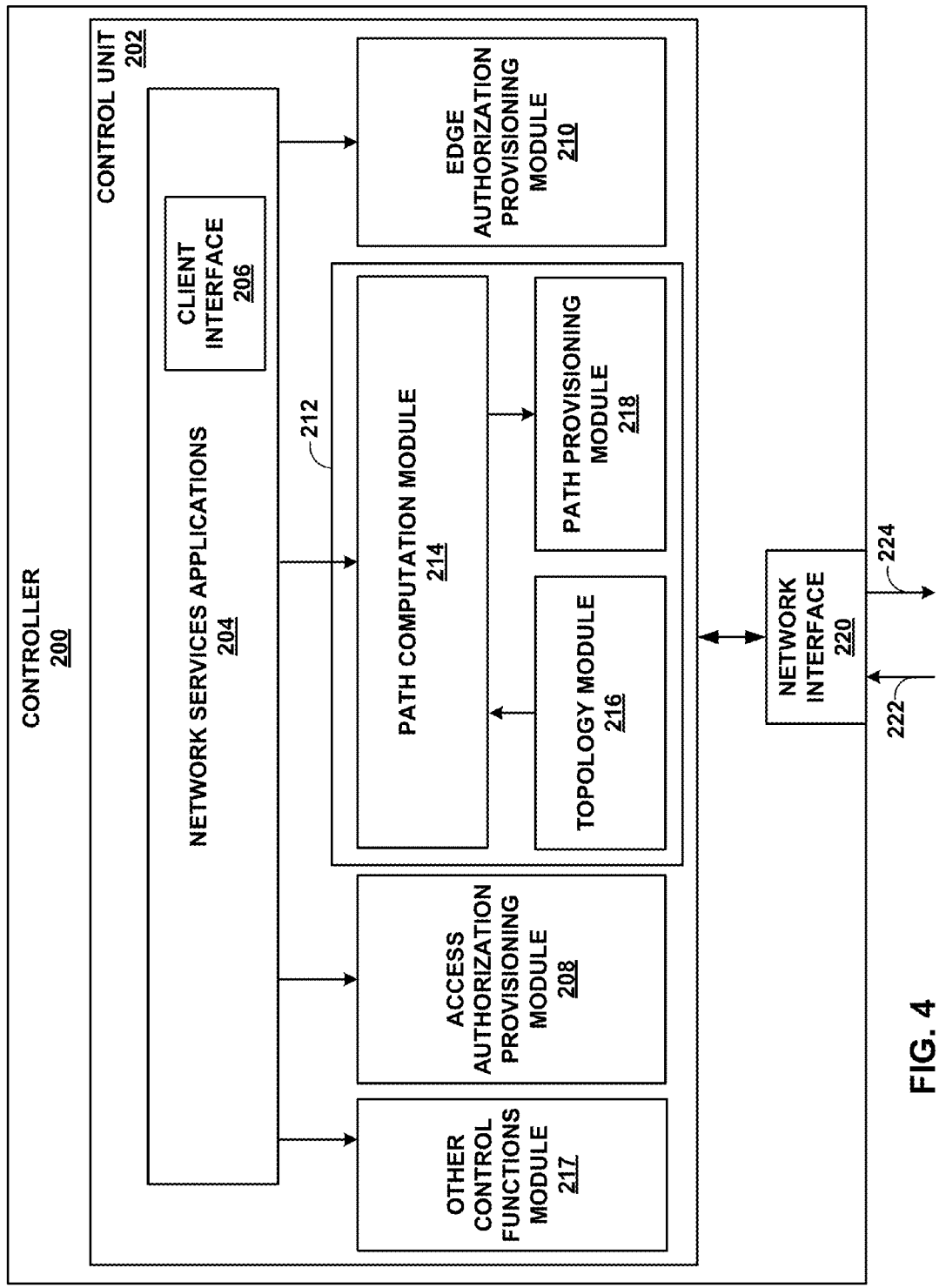
FIG. 4 is a block diagram illustrating an example controller in accordance with this disclosure.

FIG. 4 is a block diagram illustrating an example controller 200 that receives path requests, computes and schedules paths that satisfy the path requests, and establishes requested paths in a path computation domain according to techniques described herein. Controller 200 may include a server or network controller, for example, and may represent an example instance of controller 35 of FIG. 1.

In the example of FIG. 4, controller 200 includes a control unit 202 coupled to a network interface 220 to exchange packets with other network devices by inbound link 222 and outbound link 224. Control unit 202 may include one or more processors (not shown in FIG. 4) that execute software instructions, such as those used to define a software or computer program, stored to a computer-readable storage medium (again, not shown in FIG. 4), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively or additionally, control unit 202 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 202 provides an operating environment for network services applications 204, access authorization provisioning module 208, path computation element 212, topology module 216, path provisioning module 218, and edge authorization provisioning module 210. In one example, these modules may be implemented as one or more processes executing on one or more virtual machines of one or more servers. That is, while generally illustrated and described as executing on a single controller 200, aspects of these modules may be delegated to other computing devices.

Network services applications 204 represent one or more processes that provide services to clients of a wireless mesh network that includes controller 200 to manage connectivity in the path computation domain according to techniques of this disclosure. Network services applications 204 may provide, for instance, include Voice-over-IP (VoIP), Video-on-Demand (VOD), bulk transport, walled/open garden, IP Mobility Subsystem (IMS) and other mobility services, and Internet services to clients of the service provider network. Networks services applications 204 require services provided by path computation element 212, such as node management, session management, and policy enforcement. Each of network services applications 204 may include client interface 206 by which one or more client applications request services. Client interface 206 may represent a command line interface (CLI) or graphical user interface (GUI), for instance. Client 206 may also, or alternatively, provide an application programming interface (API) such as a web service to client applications.

Network services applications 204 can issue path requests to path computation element 212 to request paths in a path computation domain controlled by controller 200. In general, a path request may include a required bandwidth or other constraint and two endpoints representing wireless devices that communicate over the path computation domain managed by controller 200, for example. Path requests may further specify time/date during which paths must be operational and CoS parameters (for instance, bandwidth required per class for certain paths).

Path computation element 212 accepts path requests from network services applications 204 to establish paths between the endpoints over the path computation domain. Paths may be requested for different times and dates and with disparate bandwidth requirements. Path computation element 212 reconciling path requests from network services applications 204 to multiplex requested paths onto the path computation domain based on requested path parameters and anticipated network resource availability.

To intelligently compute and establish paths through the path computation domain, path computation element 212 includes topology module 216 to receive topology information describing available resources of the path computation domain, including wireless devices, interfaces thereof, and interconnecting communication links.

In some instances, topology module 216 provides an interface by which controller 35 receives topology information from aggregation network 24. Topology module 216 may, for example, use a communication protocol to receive topology information from one or more of WAPs 12 and WDs 14, where the WAPs 12 and WDs 14 automatically discover the topology of mesh network 20 in accordance with the CCP as described herein. One example protocol is "OpenFlow," is a communication protocol that provides direct access to the data plane of a network switch or router. In some instances, controller 200 may receive messages from one or more of WAPs 12 and WDs 14 in accordance with a protocol where payloads of the protocol messages encapsulate CCP messages. In other examples, topology module 216 may receive CCP messages directly from WAPs 12 and/or WDs 14. Further example details of the OpenFlow protocol is described in "OpenFlow Switch Specification," Open Networking Foundation, Version 1.2, Dec. 5, 2011, incorporated herein by reference.

In some examples, topology module 216 may receive topology information from the WAPs 12 and/or WDs 14 of mesh network 20, and a path computation module (PCM) 214 computes forwarding information for transport data channels in accordance with the topology information. In other examples, topology module 216 may receive the topology information from a centralized topology database. In a further example, topology module 216 may execute an interior routing protocol to receive the topology information from the WAPs 12 and/or WDs 14.

As further explained below, in one example implementation, path computation module 214 handles topology computation for the whole of mesh network 20 and programs forwarding information into WAPs 12 and WDs 14 by way of path provisioning module 218. Like topology module 216, path provisioning module 218 may use a communication protocol or the CCP to communicate forwarding information to WAPs 12 and WDs 14 for configuring data planes of the WAPs 12 and WDs 14.

Path computation module 214 of path computation element 212 computes requested paths through the path computation domain. In general, paths are unidirectional. Upon computing paths, path computation module 214 schedules the paths for provisioning by path provisioning module 218. A computed path includes path information usable by path provisioning module 218 to establish the path in the network. Provisioning a path may require path validation prior to committing the path to provide for packet transport.

Access authorization and provisioning module 208 can, in some examples, program authorization, policy provisioning information records as well as packet policers into wireless devices, such as WAPs 12 and WDs 14 of FIG. 1. Similarly, edge authorization and provisioning module 210 may program authorization, policy provisioning information records as well as packet policers into WAPs 12 and WDs 14. Network services applications 204 may comprise applications for governing and controlling the distribution of such control information to the access nodes and the edge routers.

As further described below, the cloud control protocol (CCP) allows network nodes to discover their neighbors and report these neighbors to controller 200. Controller 200 can compute the topology of the network based on the reports received by controller 200. Given this topology, in some examples the controller may then compute paths through the network and install forwarding tables in the network nodes to support packet switching between any two nodes in the network. This protocol does not rely on the data plane to be established before the topology can be discovered. Controller 200 can establish a control channel between controller 200 and each of WAPs 12 and/or WDs 14 independent of the data channel.

Controller 200 operates in accordance with the CCP to set up a Source Routed Tunnel (SRT) control channel between controller 200 and one or more of the mesh nodes. Controller 200 can output one or more messages to one or more of the mesh nodes via the SRT control channel to perform one or more control functions on behalf of the mesh nodes. For example, other control functions module 217 represents any of a variety of functionality by which controller 200 can perform one or more control functions on behalf of the mesh nodes. These other control functions can include, for example, one or more of configuration of the mesh nodes, monitoring status of the mesh nodes, image download to the mesh nodes, gathering traffic statistics about network traffic at the mesh node, gathering information about local load conditions on the mesh nodes, gathering information about error rates on the mesh nodes, or other control functions.

In one example, the Cloud Control Protocol may enable controller 200 to provide certain advantages. First, as one example, CCP may enable controller 200 to simplify the implementation of network nodes, such as the WDs described herein. The mesh nodes need not each execute a routing protocol that learns routing information and generates forwarding information for the mesh node device. For example, each of the mesh nodes may utilize the CCP protocol to automatically discover its neighbors and to report those neighbors to a controller. Second, use of the Cloud Control Protocol may enable controller 200 to centralize the complex functions of topology discovery, path selection and traffic engineering. Centralization may help achieve the goal of maintaining simplicity of each individual mesh node, e.g., by removing complex control-plane software from each of the wireless nodes. Centralization may also allow for deterministic provisioning of traffic-engineered paths and their failure paths through the network. In some instances, centralized path computation by controller 200 may by simpler than distributed computation and may converge more quickly. Centralization may also allow for control and management of an entire mesh network from a single entity, e.g., a set of one or more controllers, thereby simplifying and enhancing operations by providing a high-level view of the mesh network. Third, use of CCP may enable separation of the control protocol from the paths used by the data plane, so that even when there are failures, the control protocol is robust enough to continue to operate. In addition, a centralized algorithm may not have convergence issues and can be deterministic.

Figure 5:
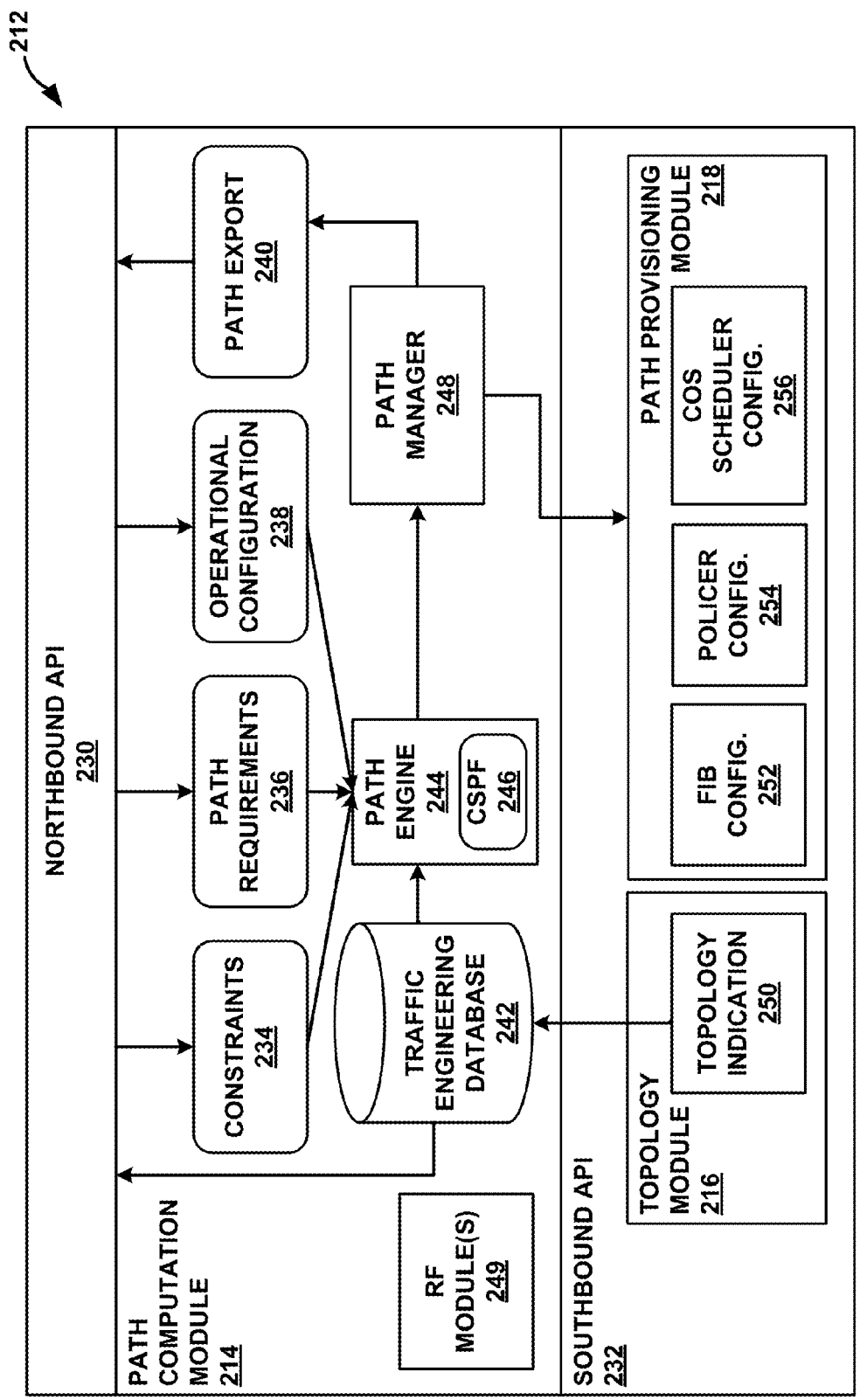
FIG. 5 is a block diagram illustrating, in detail, an example implementation of a path computation element of the centralized controller.

FIG. 5 is a block diagram illustrating, in detail an example implementation of path computation element 212 of controller 200 of FIG. 4. In this example, path computation element 212 includes northbound and southbound interfaces in the form of northbound application programming interface (API) 230 and southbound API (232). Northbound API 230 includes methods and/or accessible data structures by which network services applications 204 may configure and request path computation and query established paths within the path computation domain. Southbound API 232 includes methods and/or accessible data structures by which path computation element 212 receives topology information for the path computation domain and establishes paths by accessing and programming data planes of WAPs and/or other wireless devices within the path computation domain.

Path computation module 214 includes data structures to store path information for computing and establishing requested paths. These data structures include constraints 234, path requirements 236, operational configuration 238, and path export 240. Network services applications 204 may invoke northbound API 230 to install/query data from these data structures. Constraints 234 represent a data structure that describes external constraints upon path computation. Constraints 234 allow network services applications 204 to, e.g., modify link attributes before path computation module 214 computes a set of paths. In some examples, Radio Frequency (RF) modules 249 may edit information associated with wireless links to indicate that resources are shared between a group and resources must be allocated accordingly. In some examples, RF modules 249 may edit information relating to link scheduling and/or link loading. Network services applications 204 (FIG. 4) may modify attributes of links to effect resulting traffic engineering computations in accordance with CCP. In such instances, link attributes may override attributes received from topology indication module 250 and remain in effect for the duration of the node/attendant port in the topology. A link edit message to constraints 234 may include a link descriptor specifying a node identifier and port index, together with link attributes specifying a bandwidth, expected time to transmit, shared link group, and fate shared group, for instance. PCE 214 may send the link edit message to the relevant wireless device(s) in the wireless mesh network.

Operational configuration 238 represents a data structure that provides configuration information to path computation element 214 to configure the path computation algorithm with respect to, for example, class of service (CoS) descriptors and detour behaviors. Operational configuration 238 may receive operational configuration information in accordance with CCP. An operational configuration message may specify CoS value, queue depth, queue depth priority, scheduling discipline, over provisioning factors, detour type, path failure mode, and detour path failure mode, for instance. A single CoS profile may be used for the entire path computation domain. Example CoS values are described as follows:

Queue Depth: Queue Depth represents the amount of time a packet can sit in a queue before it becomes stale. For TCP traffic, this time is generally the round trip time of the TCP session (150 msec). For VoIP this time is generally 10 to 50 msec. Different nodes may have different buffer capacities. It may not be possible to guarantee a specific time allotment per queue. Nodes should therefore be able to size queues according to the available buffer space and the service class for the queue.

Queue Depth Priority: When a class of service is active over some interface, the interface queues are sized to buffer at the indicated depth based on the bandwidth for the class. If there is insufficient buffer space, queue size is reduced according to queue depth priority. Lower priority classes are reduced before higher priority classes.

Scheduling Discipline: Scheduling Discipline determines how the queue is scheduled with respect to other queues.

resource constraints. This attribute may only be applicable when Detour Type is Strict-TE.

Service Class: To make configuration of CoS parameters easier, each CoS can be associated with a specific service class that has default values for each parameter. Example service classes are defined in the following table.

| Service Class | Queue Depth | Queue Depth Priority | Scheduling Discipline | Over Provisioning Factor | Detour Type | Path Failure Mode | Detour Path Failure Mode |
|---|---|---|---|---|---|---|---|
| Conversational Voice | 20 msec | High | Strict | 1 | Strict-TE | PPR | PPR |
| Video | 50 msec | Medium | DWRR | 2 | CoS-only | PPR | N/A |
| Assured Forwarding | 150 msec | Medium | DWRR | 10 | CoS-only | PPR | N/A |
| Best Effort | 100 msec | Low | DWRR | 20 | Best-effort | PPR | N/A |

Deficit-weighted round-robin (DWRR) may be used, together with Strict scheduling for voice traffic. In some examples, controller 200 configures the schedulers on all node interfaces according to the bandwidth and scheduling class for each CoS active on the interface.

Over-Provisioning Factor: When a path is routed through the network/path computation domain, the path received allocated bandwidth from each link over which the path is routed. For some classes of service is it appropriate to over-provision the network. This allows the policers at the edge and access to admit more traffic into the network than the network may actually be able to handle. This might be appropriate in cases where the traffic is best effort, for example. By over-provisioning certain classes of traffic, the network operator may realize better network utilization while still providing required QoS for other classes that are not over-provisioned.

Detour Type: Specifies the traffic engineering requirements for computed detours. Due to resource restrictions, users may elect to configure detours that have fewer constraints than the primary paths. Detour paths may, for instance, take on one of the following values: None, Best-effort, CoS-only, Strict-TE. The None value specifies do not compute detours. The Best-effort value specifies compute detours but ignore TE bandwidth and CoS requirements. CoS is dropped from the packet header and therefore the detour traffic gets best-effort CoS. The CoS-only value specifies preserve CoS but do not traffic engineer the detour. Under these conditions, traffic competes with other primary path traffic equally for available resources, therefore, interface congestion may occur when the detour is active. The Strict-TE value specifies preserve CoS and traffic engineering for the detour.

Path Failure Mode: Defines the per-CoS behavior to take when the primary path computation fails due to resource constraints. The Proportional Path Reduction (PPR), Ignore, and Fail options are available. The PPR option specifies all paths traversing the congested links are reduced proportionally until all paths can be accommodated over the points of congestion. The Ignore option specifies raise an alert message but otherwise allow the network to operate in this oversubscribed manner. The Fail option specifies failure to compute the remainder of the paths and do not admit traffic for failed paths into the network.

Detour Path Failure Mode: Defines the behavior of the system when detour paths cannot be computed due to The Service Class assigned to a Class of Service may be independent of the node as an attribute of the path computation domain.

Path export 240 represents an interface that stores path descriptors for all paths currently committed or established in the path computation domain. In response to queries received via northbound API 230, path export 240 returns one or more path descriptors. Queries received may request paths between any two edge and access nodes terminating the path(s). Path descriptors may be used by network services applications 204 to set up forwarding configuration at the wireless devices terminating the path(s). In some examples, path descriptor may include an Explicit Route Object (ERO). A path descriptor or "path information" may be sent, responsive to a query from an interested party, in accordance with CCP. A path export message delivers path information including path type (primary or detour); bandwidth for each CoS value; and, for each node in the ordered path from ingress to egress, a node identifier, ingress label, and egress label.

Path requirements 236 represent an interface that receives path requests for paths to be computed by path computation module 236 and provides these path requests (including path requirements) to path engine 244 for computation. Path requirements 236 may be received in accordance with CCP, or may be handled by the PCE. In such instances, a path requirement message may include a path descriptor having an ingress node identifier and egress node identifier for the nodes terminating the specified path, along with request parameters including CoS value and bandwidth. A path requirement message may add to or delete from existing path requirements for the specified path.

Topology module 216 includes topology indication module 250 to handle topology discovery and, where needed, to maintain control channels between path computation element 212 and nodes of the path computation domain. Topology indication module 250 may include an interface to describe received topologies to path computation module 214.

Topology indication module 250 may use CCP topology discovery or some other topology discovery protocol to describe the path computation domain topology to path computation module 214. Using CCP topology discovery, topology indication module 250 may receive a list of node neighbors, with each neighbor including a node identifier, local port index, and remote port index, as well as a list of link attributes each specifying a port index, bandwidth, expected time to transmit, shared link group, and fate shared group, for instance.

Topology indication module 250 may communicate with a topology server, such as a routing protocol route reflector, to receive topology information for a network layer of the network. Topology indication module 250 may include a routing protocol process that executes a routing protocol to receive routing protocol advertisements, such as Open Shortest Path First (OSPF) or Intermediate System-to-Intermediate System (IS-IS) link state advertisements (LSAs) or Border Gateway Protocol (BGP) UPDATE messages. Topology indication module 250 may in some instances be a passive listener that neither forwards nor originates routing protocol advertisements. In some instances, topology indication module 250 may alternatively, or additionally, execute a topology discovery mechanism such as an interface for an Application-Layer Traffic Optimization (ALTO) service. Topology indication module 250 may therefore receive a digest of topology information collected by a topology server, e.g., an ALTO server, rather than executing a routing protocol to receive routing protocol advertisements directly.

In some examples, topology indication module 250 receives topology information that includes traffic engineering (TE) information. Topology indication module 250 may, for example, execute Intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as error rates and/or bandwidth available for use at various priority levels of links connecting routers of the path computation domain. In some instances, indication module 250 executes BGP-TE to receive advertised TE information for inter-autonomous system and other out-of-network links. Additional details regarding executing BGP to receive TE info are found in U.S. patent application Ser. No. 13/110,987, filed May 19, 2011 and entitled "DYNAMICALLY GENERATING APPLICATION-LAYER TRAFFIC OPTIMIZATION PROTOCOL MAPS," which is incorporated herein by reference in its entirety.

Traffic engineering database (TED) 242 stores topology information, received by topology indication module 250, for a network that constitutes a path computation domain for controller 200 to a computer-readable storage medium (not shown). TED 242 may include one or more link-state databases (LSDBs), where link and node data is received in routing protocol advertisements, received from a topology server, and/or discovered by link-layer entities such as an overlay controller and then provided to topology indication module 250. In some instances, an operator may configure traffic engineering or other topology information within MT TED 242 via a client interface.

Path engine 244 accepts the current topology snapshot of the path computation domain in the form of TED 242 and computes, using TED 242, CoS-aware traffic-engineered paths between nodes as indicated by configured node-specific policy (constraints 234) and/or through dynamic networking with external modules via APIs. Path engine 244 may further compute detours for all primary paths on a per-CoS basis according to configured failover and capacity requirements (as specified in operational configuration 238 and path requirements 236, respectively).

In general, to compute a requested path, path engine 244 determines based on TED 242 and all specified constraints whether there exists a path in the layer that satisfies the TE specifications for the requested path for the duration of the requested time. Path engine 244 may use the Djikstra constrained SPF (CSPF) 246 path computation algorithms for identifying satisfactory paths though the path computation domain. If there are no TE constraints, path engine 244 may revert to SPF. If a satisfactory computed path for the requested path exists, path engine 244 provides a path descriptor for the computed path to path manager 248 to establish the path using path provisioning module 218. A path computed by path engine 244 may be referred to as a "computed" path, until such time as path provisioning 218 programs the scheduled path into the network, whereupon the scheduled path becomes an "active" or "committed" path. A scheduled or active path is a temporarily dedicated bandwidth channel for the scheduled time in which the path is, or is to become, operational to transport flows.

Path manager 248 establishes computed scheduled paths using path provisioning module 218, which in this instance includes forwarding information base (FIB) configuration module 252 (illustrated as "FIB CONFIG. 252"), policer configuration module 254 (illustrated as "POLICER CONFIG. 254"), and CoS scheduler configuration module 256 (illustrated as "COS SCHEDULER CONFIG. 256").

FIB configuration module 252 programs forwarding information to data planes (also referred to herein as forwarding planes) of wireless devices of the path computation domain. FIB configuration module 252 may implement, for instance, a protocol such as the OpenFlow protocol to provide and direct the wireless devices to install forwarding information to their respective data planes. Accordingly, the "FIB" may refer to forwarding tables in the form of, for instance, one or more OpenFlow flow tables each comprising one or more flow table entries that specify handling of matching packets. FIB configuration module 252 may in addition, or alternatively, implement other interface types, such as a Simple Network Management Protocol (SNMP) interface, path computation element protocol (PCEP) interface, a Device Management Interface (DMI), a CLI, Interface to the Routing System (IRS), or any other node configuration interface.

FIB configuration module interface 62 establishes communication sessions with wireless devices to install forwarding information to receive path setup event information, such as confirmation that received forwarding information has been successfully installed or that received forwarding information cannot be installed (indicating FIB configuration failure). Additional details regarding PCEP may be found in J. Medved et al., U.S. patent application Ser. No. 13/324,861, "PATH COMPUTATION ELEMENT COMMUNICATION PROTOCOL (PCEP) EXTENSIONS FOR STATEFUL LABEL SWITCHED PATH MANAGEMENT," filed Dec. 13, 2011, and in "Path Computation Element (PCE) Communication Protocol (PCEP)," Network Working Group, Request for Comment 5440, March 2009, the entire contents of each of which being incorporated by reference herein. Additional details regarding IRS are found in "Interface to the Routing System Framework," Network Working Group, Internet-draft, Jul. 30, 2012, which is incorporated by reference as if fully set forth herein.

FIB configuration module 252 may add, change (i.e., implicit add), or delete forwarding table entries in accordance with information received from path computation module 214 according to CCP. A CCP FIB configuration message from path computation module 214 to FIB configuration module 252 may specify an event type (add or delete); a node identifier; a path identifier; one or more forwarding table entries each including an ingress port index, ingress label, egress port index, and egress label; and a detour path specifying a path identifier and CoS mode. FIB configuration module 252 can program any of a variety of forwarding objects to the mesh nodes including, for example, configuring firewall filters, pseudowires, and port and MAC based forwarding entries.

Policer configuration module 254 may be invoked by path computation module 214 to request a policer be installed on a particular wireless device for a particular data channel ingress. In some examples the FIBs for wireless devices may include policers at data channel ingress. Policer configuration module 254 may receive policer configuration requests according to CCP. A CCP policer configuration request message may specify an event type (add, change, or delete); a node identifier; a data channel identifier; and, for each class of service, a list of policer information including CoS value, maximum bandwidth, burst, and drop/remark. FIB configuration module 252 configures the policers in accordance with the policer configuration requests.

CoS scheduler configuration module 256 may be invoked by path computation module 214 to request configuration of CoS scheduler on the aggregation nodes or access nodes. CoS scheduler configuration module 256 may receive the CoS scheduler configuration information in accordance with CCP. A CCP scheduling configuration request message may specify an event type (change); a node identifier; a port identity value (port index); and configuration information specifying bandwidth, queue depth, and scheduling discipline, for instance.

Various example Control Packet Formats will now be described. With reference to FIGS. 1-5, for example, these control packets may be exchanged between controller 35 and WAPs 12, between controller 35 and aggregation nodes 19, between controller 35 and WDs 14, and between controller 200 and WD 110, for example.

Figure 6:
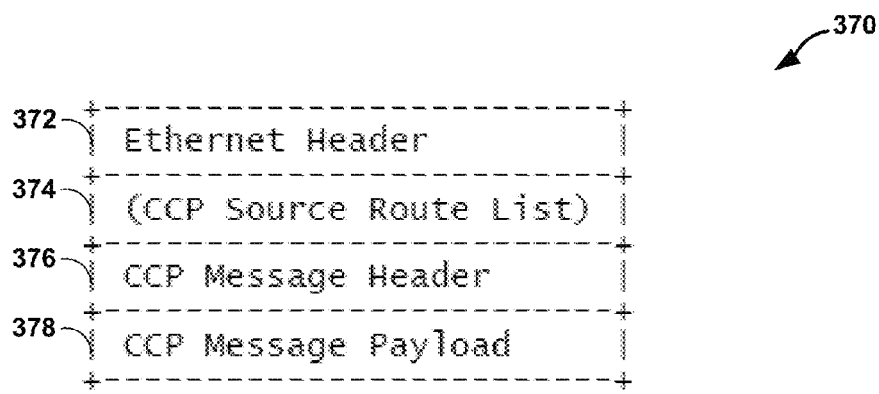
FIG. 6 is a block diagram illustrating an example Base Packet structure for a control packet according to the techniques of this disclosure.

In one example embodiment, the control packets have the structure illustrated in FIG. 6. FIG. 6 is a block diagram illustrating an example Base Packet Structure 370 for a control packet according to the techniques of this disclosure.

The Ethernet Header 372 is a standard Ethernet II header. The Ethernet header 372 is used so that the CCP Control plane can be run natively over standard Ethernet interfaces. If other physical or logical interfaces are used, the only requirement placed on those interfaces is that they can transport an Ethernet frame. Generally, the source MAC address is the address of the sending node and the destination address is the address of the receiving node or all Fs in the case of broadcast (Flood) packets. The Ether type is TBD1 (currently using 0xA000) for packets without a Source Route List and TBD2 (0xA001) for packets with a Source Route List.

CCP Source Route List 374 is an optional field. CCP Source Route List 374 inclusion is dependent on the type of message. CCP Source Route List 374 is present in messages that are sent using an SRT. CCP Source Route List 374 is an ordered list of node specific ingress and egress link indexes that are used by nodes to source route a packet from one node to another. The CCP Message Header 376 includes the message type. CCP Message Payload: The CCP Message Payload 378 is the payload for the specified message type.

Figure 7:
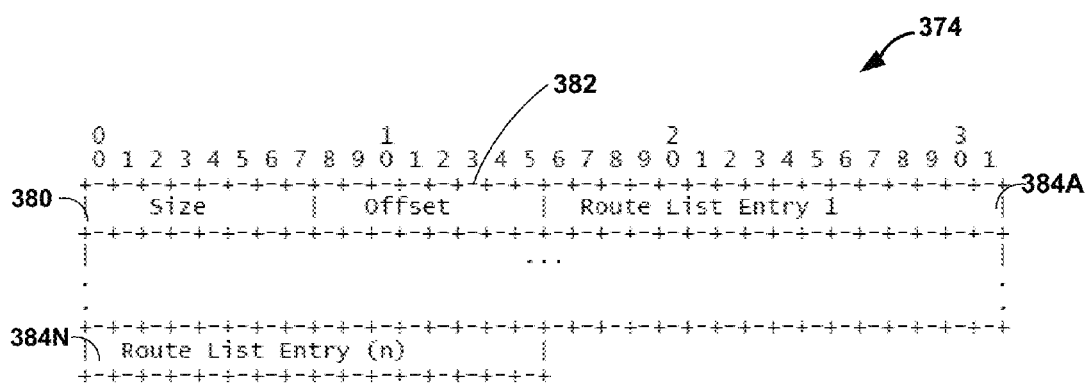
FIG. 7 is a block diagram illustrating an example CCP Source Route List field in further detail, according to one example embodiment.

FIG. 7 is a block diagram illustrating an example CCP Source Route List field 374 in further detail, according to one example embodiment. The Source Route List is a list of ingress and egress link indexes from the starting node to the terminating node, inclusive. As there is no ingress interface as the starting node, the special link index 0xFF is used to indicate that this is the initial node. As there is no egress link at the terminating node the egress link index is set to 0xFF indicating the list has terminated and the node should consume the packet.

Size field 380 includes the total size in bytes of all the route list entries. Offset field 382 includes the Offset in bytes into the Route List Entry List. Offset field 382 is initialized to 0 from the control plane of the sending node and incremented by 2 by each node including the sending node as the packet is transmitted out the egress link. The Route List Entry (RLE) fields 384A-384N include the ingress and egress link indexes for the receiving node. When an SRT packet is received its ingress link index MUST match the ingress link index specified in the RLE.

Figure 8:
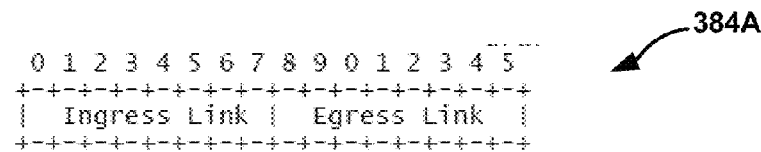
FIG. 8 is a block diagram illustrating an example Route Entry List field in further detail, according to one example embodiment.

FIG. 8 is a block diagram illustrating an example Route Entry List field 384A in further detail, according to one example embodiment. The structure of the route list entry is as follows. An Ingress Link field specifies the link the packet should ingress from. An Egress Link field specifies the link the packet should egress to.

Figure 9:
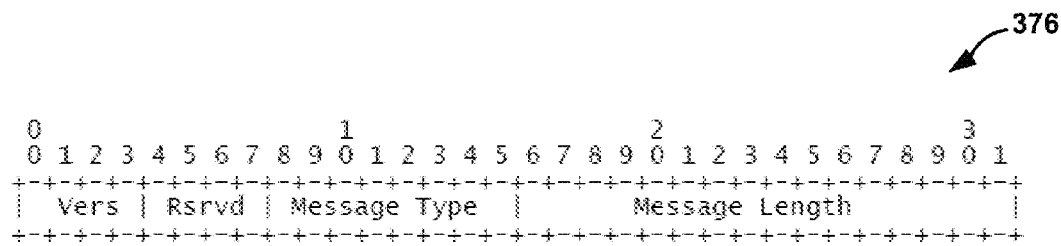
FIG. 9 is a block diagram illustrating an example CCP Message Header in further detail, according to one example embodiment.

FIG. 9 is a block diagram illustrating an example CCP Message Header 376 in further detail, according to one example embodiment. The CCP Message Header 376 is used to identify the CCP message type. CCP Message Header 76 has the structure shown in FIG. 9. The version field ("Vers") includes the version number of the protocol. This document defines protocol version 1. The Reserved field ("Rsrvd") is reserved and must be set to zero and ignored by the receiver. The Message Type field specifies the CCP message type. The Message Length field specifies the length of the Message Payload.

Figure 10:
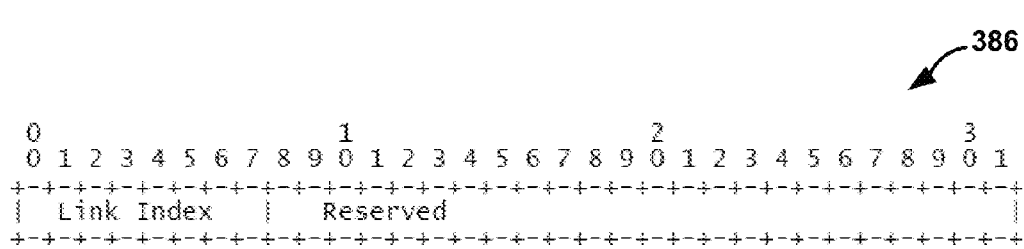
FIG. 10 is a block diagram illustrating an example Hello Message in accordance with the techniques of this disclosure.

According to some example embodiments, the following CCP message types are defined:
 1: Hello
 2: Hello Reply
 3: Discover
 4: Discover Reply
 5: Keepalive
 6: Keepalive Reply
 7: SRT Down
 8: FIB Config
 9: FIB Config Reply FIG. 10 is a block diagram illustrating an example Hello Message 386 in accordance with the techniques of this disclosure. The Hello message 387 is link-local broadcast message is used to discover a neighbor across a point to point link. A node sends a hello message periodically on its links at a rate chosen by the sending node. The hello message is used for both discovery and to determine the liveness of the link. In one example aspect, the source address of the Ethernet header MUST be the MAC address of the sending node and the destination address MUST be all Fs.

In one example, the Hello message has the following structure as shown in FIG. 10. The Link Index field specifies the senders Link Index. The link index is local to the sender. Links are indexed from 0 to 0xFE. The Link Index of 0xFF is reserved for the control plane of the node. Therefore CCP nodes are restricted to 255 interfaces. The Reserved field is reserved and must be set to zero and ignored by the receiver.

The Hello Reply message (not shown) is a unicast message used to reply to a Hello is set to active by the receiver. The sender of the Hello Reply message sets the Source Address of the Ethernet Header to its MAC address. The sender sets the Destination address of the Ethernet Header to the Source Address of the corresponding Hello message. The Hello Reply message is sent on the same link from which the Hello message was received. The structure of the Hello Reply message is the same as the Hello message. The Link Index is set to the local link index on which the corresponding Hello message was received.

FIG. 11 is a block diagram illustrating an example Discover message 388 in accordance with the techniques of this disclosure. The Discover message 388 is generated by a node when its neighbor list changes or when its currently active SRT times out. In either case, a new generation number is generated. The Discover message 388 is periodically sent until its corresponding Flood Reply is received.

In one example, the Discover message has the following structure as shown in FIG. 11. The Instance ID is a unique number for the instance of the node. A node should generate a new instance ID each time it reboots or otherwise resets its software state. The instance ID is used to disambiguate a Discover message with the same generation number between resets. The instance ID may be a random number or a monotonically increasing integer for nodes having some ability to store information between reboots.

The Generation Number is a monotonically increasing number. The controller ignores any Discover message with a generation number less than the most recently received generation number (unless the R bit is set).

The Intermediate Node List (INL) Start is the offset from the beginning of the CCP Message Payload to the start of the Intermediate Node List. This offset is required since the Neighbor Node List is variable in length. The INL End is the offset from the beginning of the CCP Message Payload to the end of the Intermediate Node List. The Neighbor Node List element 390 is the list of Neighbors associated with this node. Each element in the list includes the Neighbor's MAC address, the local link index on which a Hello Reply message was received and the Neighbor's link index as indicated in the Hello Reply message. The Intermediate Node List element 392 includes the MAC addresses and their corresponding ingress and egress links through which this packet traversed en route from the originating node to the terminating edge node (EN) inclusive.

FIG. 12 is a block diagram illustrating an example Neighbor Node List element 390 of the Discover message 388 (FIG. 11) in further detail, according to one example. In this example, the Neighbor Node List element 390 has the following structure:

Neighbor MAC Address specifies the MAC Address of the neighbor as reported in the Ethernet Source MAC of the Hello Reply Message. The Local Link field specifies the local link index over which the Hello Reply was received. Remote Link: The remote link index as reported in the Link Index of the Hello Reply packet.

Figure 13:
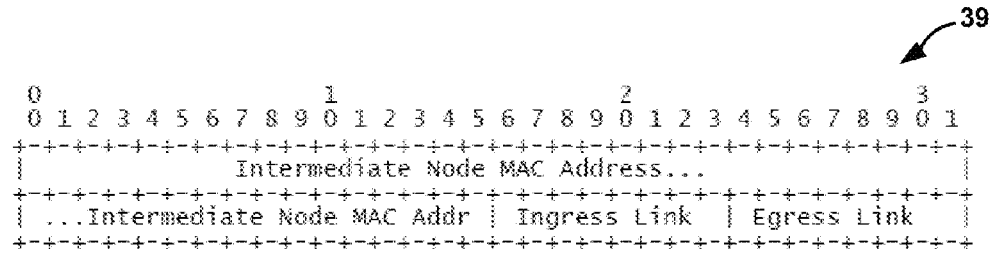
FIG. 13 is a block diagram illustrating an example Intermediate Node List element of the Discover message in further detail, according to one example.

FIG. 13 is a block diagram illustrating an example Intermediate Node List element 392 of the Discover message 88 (FIG. 11) in further detail, according to one example. In this example, the Intermediate Node List element 392 has the following structure:

Intermediate MAC Address field specifies the MAC address of a node that received the Discover message and re-sent the packet. Ingress Link field specifies: The index of the link on which the packet was received. Egress Link field specifies: The index of the link on which the packet was sent. Note that when the packet is sent, the Egress Link is modified for each link over which the packet is sent.

Figure 14:
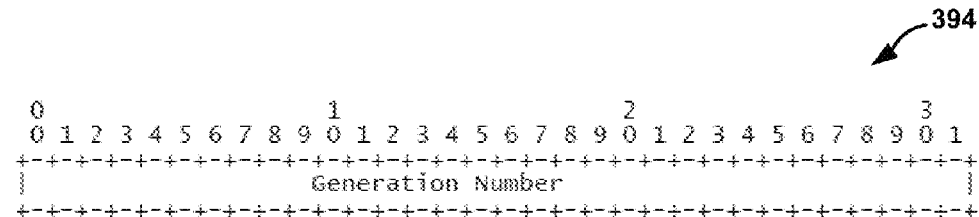
FIG. 14 is a block diagram illustrating an example Discover reply Message according to the techniques of this disclosure.

FIG. 14 is a block diagram illustrating an example Flood Reply Message 94 according to the techniques of this disclosure. The Flood Reply message is sent by the controller to acknowledge receipt of the Discover packet. The Flood Reply is sent via an SRT indicating that there is an SRL preceding the message payload.

In one example, the Flood Reply Message Structure is as shown in FIG. 14. The Generation number is used to correlate the Flood Reply with the original Discover message. In one example, if the Generation number does not match the current generation number, the node will discard the message. If they do match, the node can initiate keepalive processing on the reversed SRT associated with this Flood Reply message.

In some aspects, a Keepalive message is used to maintain liveness of an SRT. The Keepalive message is periodically sent by a node after it has received a Flood Reply for the current generation number. The Keepalive message is sent via an SRT from a node to the controller. Otherwise, the Keepalive message has no additional content.

A Keepalive Reply message is sent by the controller upon receiving a Keepalive message. The Keepalive Reply message has no content. The Keepalive Reply message is sent via an SRT to the sender of the corresponding Keepalive message.

A SRT Down message (see FIG. 15) may be used to indicate to a sending node that the SRT over which it has sent packet has broken. This SRT Down message may provide immediate feedback to the sender that the SRT is down. With this indication, the sender does not have to wait for a keepalive timeout before taking corrective action. When WAP or WD receives an SRT Down message, in some examples the WAP or WD will increment its generation number and generate a new Discover message to establish a new SRT with the controller.

In some examples, when a controller receives an SRT Down message controller may modify its state for the effected node such that the next Discover message from the node of equal to or greater than generation number is immediately accepted. This avoids the condition where a Flood Reply for a given generation number is not able to follow the SRT specified and all Floods from the node would be ignored since they specify a different INL.

Figure 15:
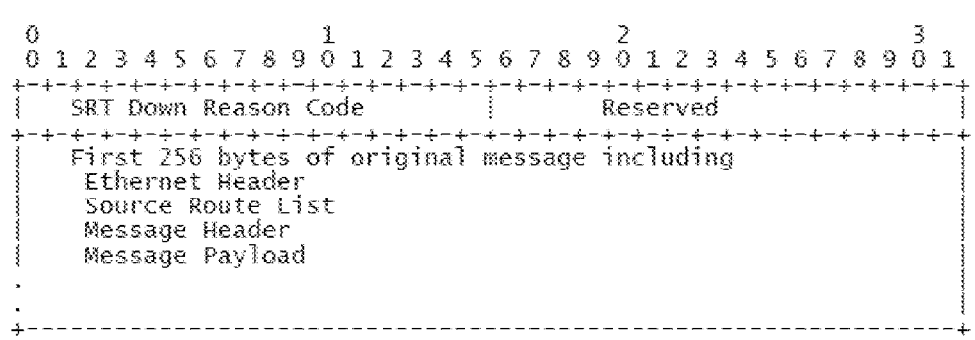
FIG. 15 is a block diagram illustrating an example SRT Down Message according to the techniques of this disclosure.

In one example, the node detecting the SRT Down may construct the SRT Down message according to the follow procedure:
  a. Construct an Ethernet header where the Source MAC is set to the MAC of the node sending the SRT Down message. The Destination MAC is set as the MAC address of the original packet.
  b. Construct a new Source Route List where the size is equal to the offset of the original packet, the offset is set to 0, and the RLE entries are the reversal of the RLEs in the original packet up the packets offset value. The first RLE entries ingress interface index is set to 0xFF.
  c. Add a new Message Header with CCP message type SRT Down and
  d. Set the SRT Down reason code.
  e. Append the first 256 bytes of the original packet including the Ethernet Header, the Source Route List, the Message Header and the Message Payload FIG. 15 is a block diagram illustrating an example SRT Down Message 396 according to the techniques of this disclosure. In the example of FIG. 15, the SRT Down Message 396 has the following structure.

The SRT Down Reason Code specifies the reason the SRT went down. Example choices include:
  0 Reserved
  1 Neighbor at egress link index is down
  2 Invalid egress link index for this node
  3 Invalid ingress link index for this node A Link Attributes Message is sent by a node to describe its link attributes to the controller. In some examples, link attributes only describe locally discoverable characteristics of links such as maximum bandwidth or link type. Logical characteristics of links such as link coloring, shared resource groups or metric values are not something a node describes, but could be something associated with the link at the controller via mechanisms such as configuration. Generally Link attributes are attributes that effect traffic engineering calculations.

Figure 16:
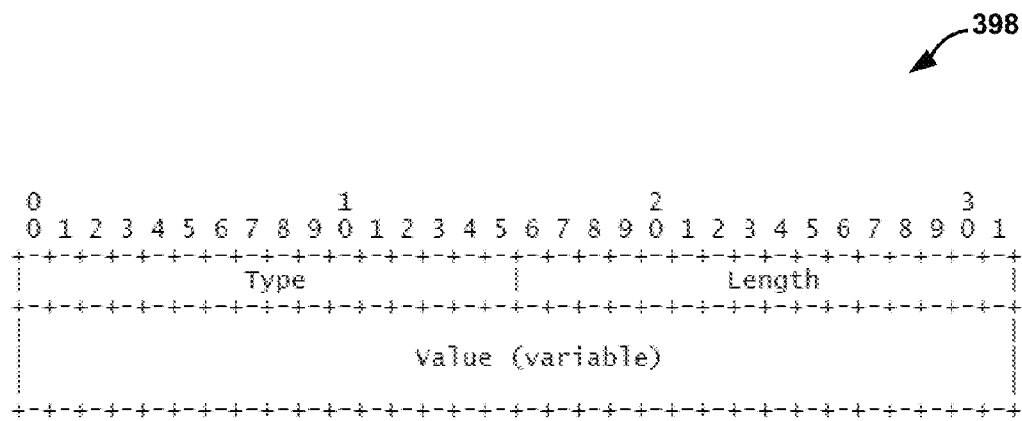
FIG. 16 is a block diagram illustrating an example Link Attributes TLV Format according to the techniques of this disclosure.

In some examples, Link Attributes are encoded as TLVs to support extensibility. FIG. 16 is a block diagram illustrating an example Link Attributes TLV Format 398 according to the techniques of this disclosure. In this example, Link Attribute fields are described using a set of Type/Length/Value triplets. The TLV is not padded to four-octet alignment; Unrecognized types are ignored.

One example Link Attribute TLV Structure is shown in FIG. 16. The Type field lists the TLV Type. Example types may include types such as the IS-IS types described in H. Gredler, "Advertising Link-State Information in BGP," Inter-Domain Routing Internet Draft, draft-gredler-bgp-to-01, Jul. 11, 2011, the entire contents of which are incorporated by reference herein. The Length field defines the length of the value portion in octets (thus a TLV with no value portion would have a length of zero).

The Value field specifies the Contents of TLV. See the specific TLV description for more information. A Max Bandwidth Link Attribute may be a 32 bit floating point BW in Bytes per second. A RF Group Link Attribute may be some unique ID that ties this link to some other link for which BW is being shared. An Expected Transmission Time specifies the time expected to transmit a packet of 1K bytes across the link. Time is measured in microseconds and is encoded as a 32 bit unsigned integer.

Figure 17:
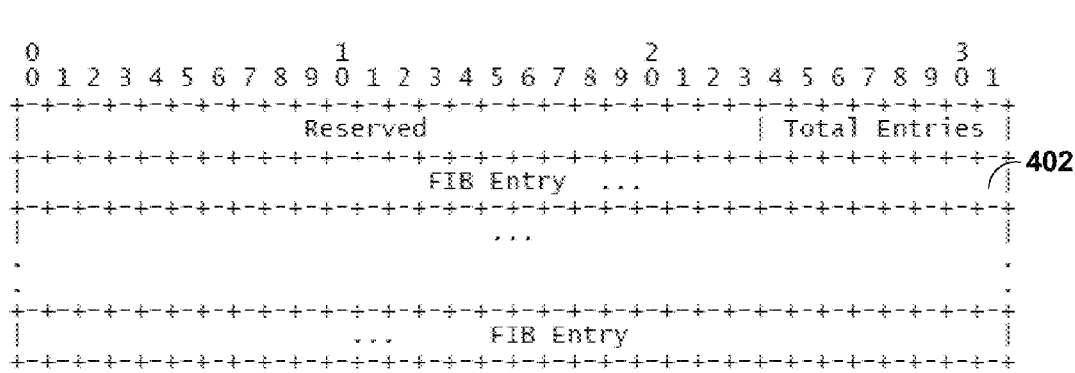
FIG. 17 is an example Forwarding Information Base (FIB) configuration Message according to the techniques of this disclosure.

FIG. 17 is an example Forwarding Information Base (FIB) configuration Message 400 according to the techniques of this disclosure. The FIB Cfg message is generated in cloud computing protocol module of controller 35 (e.g., path computation element 212 of FIG. 4) to download the pre-computed Label Information Base to individual network node (e.g., one of WAPs 12 and WDs 14 of FIG. 1) in the forwarding domain. Upon receiving the message, control plane software on the network node parses the label configuration information, in turn programs the forwarding table of the network node.

In this example, the FIB Config message has the structure shown in FIG. 17. A reserved field is for future use. Total Entries field indicates how many FIB Entry elements are being downloaded in this message. FIB Entry field 402 is the Forwarding Information for each data channel.

FIG. 18 is a block diagram illustrating an example FIB Entry 402 of FIB config message 400 (FIG. 17) in further detail, according to one example. Entry 402 has the following structure as shown in FIG. 18. Length field specifies how many bytes is this FIB entry element. OP field specifies one of the following operations to be applied to the FIB:
  ADD—a new FIB element
  CHANGE—modify an existing FIB element
  DELETE—remove an existing FIB element
M field specifies: The Class of Service (CoS) mode for the detour path as one of:
  0—Preserve the CoS bits in original packet
  1—Replace the original CoS bits with a new CoS value specified in "Value" field.
Value field specifies: The new CoS value to be used when the M bit is "1". Incoming Label specifies: label for an incoming packet. Value of "−1" is considered valid only on Ingress LSR. PATH ID field specifies: A 32-bit identifier for this FIB element. Namespace is managed by controller 35. Primary Port field specifies: Primary path Port Index local to network node.

PA field specifies: action to be operated on an incoming packet when it takes the detour path. The actions are:
  PUSH—Push the primary label to an incoming packet
  SWAP—Swap the label in an incoming packet with the primary label
  POP—Pop off the top-most label off an incoming packet
  Primary Egress Label field specifies: The Label to be pushed or swapped on to the outgoing packet. Value of "−1" is considered valid only on Egress device.

Detour Port field specifies: Port Index local to network node for a detour path is present.

DA1 field specifies: First action to be operated on an incoming packet when it takes the detour path. actions are:
  PUSH—Push the detour label 1 to an incoming packet label stack
  SWAP—Swap the outmost label in an incoming packet with the detour label 1
  POP—Pop off the top-most label off an incoming packet
  Detour Egress Label 1: The Label value used by the label operations specified in DA1. DA2 field specifies: Second action to be operated on an incoming packet when it takes the detour path. actions are:
  PUSH—Push the detour egress label 2 to the top of an incoming packet label stack.
  SWAP—Swap the outmost label in an incoming packet with the detour egress label 2.
  POP—Pop off the top-most label off an incoming packet.
  Detour Egress Label 2 field specifies: The Label value used by the label operations specified in DA2. R field: "R" fields are reserved for future use.

FIG. 19 is a block diagram illustrating an example FIB Config Reply Message 404 in accordance with the techniques of this disclosure. The FIB Config Reply message is for a network node to acknowledge back to controller 35 that the FIB Config message was received and parsed. The network node can report status for each incoming label as well.

FIB Config Reply Message Structure is as follows, as shown in FIG. 19. The total Entries field indicates how many FIB Parse Status Entry elements are being reported. Value "0" indicates no entry element is being reported, which implies the FIB Config message was parsed successfully. FIB Parse Status Entry field 406: each entry reports the status for parsing the FIB Config entry element. FIB Parse Status Entry fields 406 may not be present when "Total Entries" has "0" value.

FIG. 20 is a block diagram illustrating an example FIB Parse Status Entry 406 of FIB Config Reply Message 404 (FIG. 17) in further detail, according to one example. FIB Parse Status Entry Element has the following structure, as specified in FIG. 20. The Reserved field is currently not used. The PATH ID field specifies the identifier for the FIB Config entry element. The status field specifies the failure code for this FIB Entry parsing. Example failure codes include the following:
  0—SUCCESS
  1—Invalid Primary Egress Port
  2—Invalid Primary Label Value
  3—Invalid Primary action
  4—Invalid Detour Egress Port
  5—Invalid Detour Label Value
  6—Invalid Detour action 7—Invalid Second Detour Egress Port
8—Invalid Second Detour Label Value
9—Invalid Second Detour action
10—Invalid Incoming Label Value The cloud control protocol may include other messages besides those described herein. For example, the cloud control protocol may include a mechanism for a node to signal to a controller that the node is detecting multiple neighbors on a link. Multiple neighbors are not allowed since P2P links are assumed.

Figure 21:
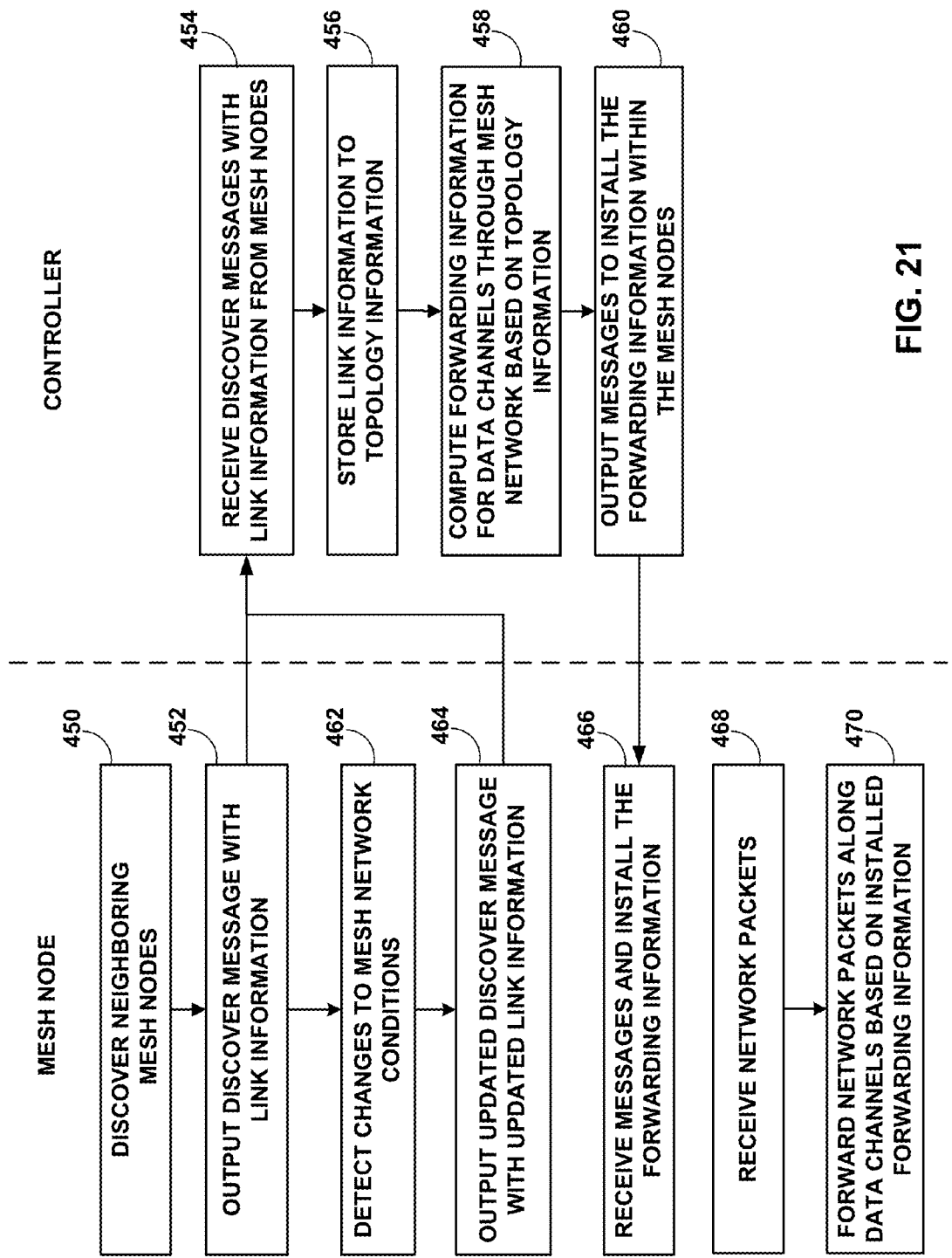
FIG. 21 is a flowchart illustrating example operation of an example system in accordance with the techniques of this disclosure.

FIG. 21 is a flowchart illustrating example operation of an example system in accordance with the techniques of this disclosure. FIG. 21 is described for purposes of illustration with respect to FIG. 1.

A WD such as WD 14D discover neighboring mesh node WD 14C, WD 14B, WD 14E, and WD 14H, and WAP 12C. WD 14D may receive one or more discover messages from its neighboring WDs (450), and WD 14D outputs a discover message to WAP 12C toward controller 35 (452). The discover message can include information about wireless links of WD 14D, and also includes information that was included in the discover messages received from its neighboring WDs. WD 14D operates a reduced control plane without execution of a layer three (L3) routing protocol that maintains routing information for the wireless mesh network and generates forwarding information for the wireless devices.

A centralized controller of the mesh network, such as controller 35, receives topology information from the plurality of mesh nodes of the network (454). Specifically, controller 35 receives the discover message from WD 14D as forwarded by intermediate mesh nodes, and may also receive other discover messages with link information from other mesh nodes. Controller 35 stores the link information to its topology information database (456), and by a path computation module (PCM) of the centralized controller 35 of the mesh network, computes forwarding information for one or more transport data channels in accordance with the topology information, wherein the data channels are for transporting network packets between the mesh nodes (458).

Controller 35 outputs one or more messages to communicate and install within the mesh nodes, including WD 14D, the forwarding information for establishing the data channels (460). WD 14D receives the message sent by controller 35, via intermediate devices, and installs the forwarding information (466). In some examples, the forwarding information can include link scheduling information. When WD 14D receives network packets associated with one or more subscriber devices (468), WD 14D can forward the network packets along the data channel based on the installed forwarding information (470).

Figure 22:
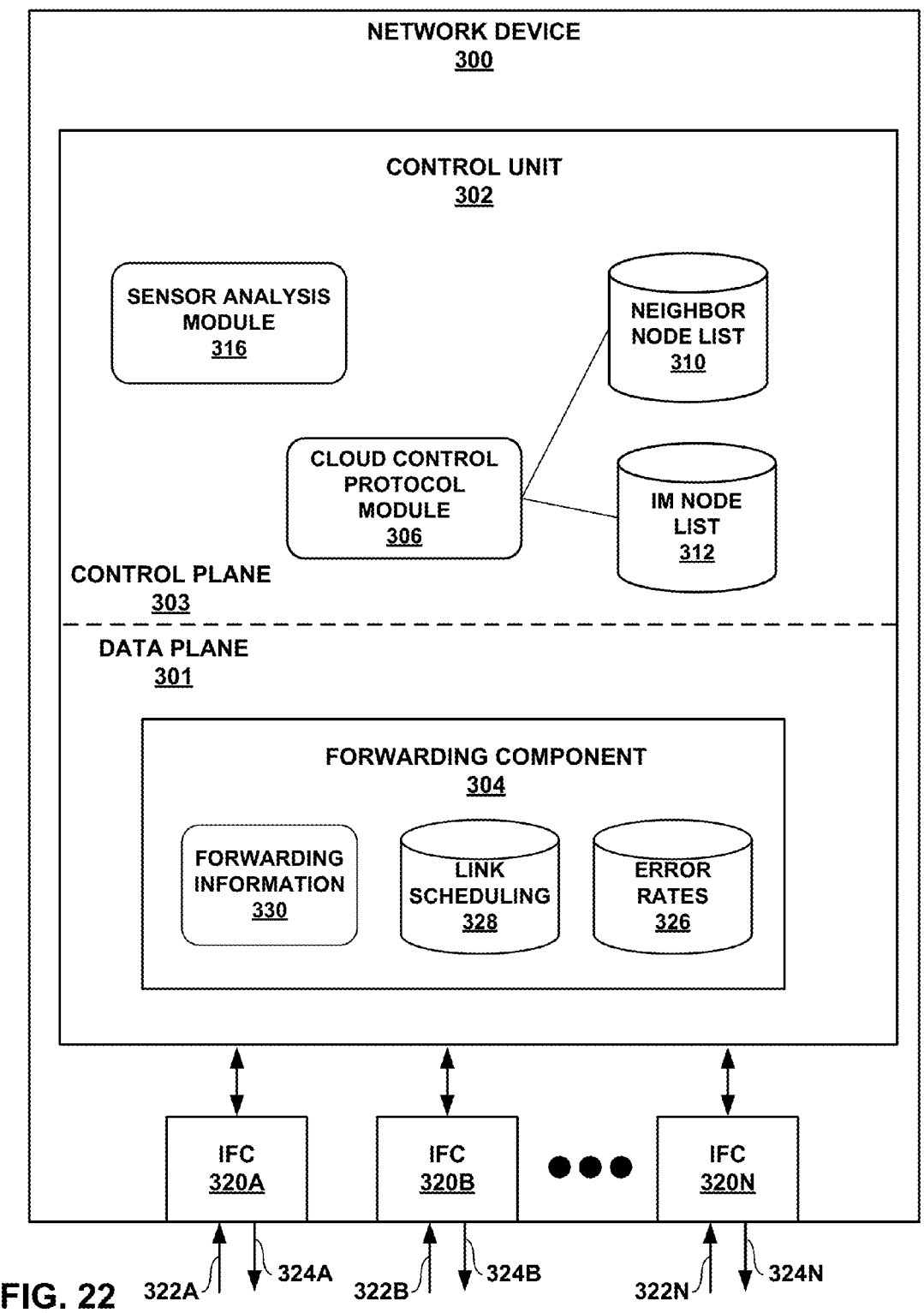
FIG. 22 is a block diagram illustrating an example network device in accordance with this disclosure.

FIG. 22 is a block diagram illustrating an example network device in accordance with this disclosure. Network device 300 may, for example, represent any of aggregation nodes 19, WDs 14, or WAPs 12 of FIG. 1, or WD 110 of FIG. 3. For example, network device 300 may be a mesh node that operates at the borders of the network and, responsive to receiving provisioning messages from the controller, applies network services including policy provisioning, policing and network connectivity to the network packets received from the subscriber devices. In some examples, network device 300 may reside at a border of an aggregation network, and operate as an endpoint for data channels to map subscriber traffic into and out of the data channels.

In the example of FIG. 22, network device 300 includes a control unit 302 that comprises data plane 301 and control plane 303. Data plane 301 includes forwarding component 304. In addition, network device 300 includes a set of interface cards (IFCs) 320A-320N (collectively, "IFCs 320") for communicating packets via inbound links 322A-322N (collectively, "inbound links 322") and outbound links 324A-324N (collectively, "outbound links 324"). Links 332, 324 can be any combination of wired and/or wireless links. Network device 300 may also include a switch fabric (not shown) that couples IFCs 320 and forwarding component 304.

In examples in which network device 300 is one of WDs 12, network device 300 can include sensor analysis module 316 to receive signals indicative of sensor data. Sensor analysis module 316 can analyze signals indicative of sensor data associated with, for example, one or more sensors for forest fire detection, air pollution monitoring, landslide detection, water quality monitoring, natural disaster prevention, machine health monitoring, structural health monitoring, or other types of sensing or monitoring. Sensor analysis module 316 may provide analyzed sensor data information to cloud control protocol module 306 to be included in discover messages to the controller.

Network device 300 executes a cloud control protocol (CCP) module 306 that operates in accordance with a cloud control protocol, also referred to herein as a discovery protocol. In some examples, cloud control protocol module 306 outputs a hello message, e.g., a Cloud Control Protocol (CCP) Hello message, on each interface and/or link. Each of the hello messages includes an identifier that is unique to network device 300 (e.g., an aggregation node or mesh node) that sent the hello message and the interface on which the hello message was sent. In accordance with the discovery protocol, network device 300 also outputs a hello reply message on each interface on which a hello message was received. Cloud control protocol module 306 maintains a neighbor node list 310 that identifies neighboring nodes from which network device 300 received hello messages and the interfaces on which the hello messages were received.

Responsive to receiving hello reply messages (e.g., a CCP Hello Reply message) on a link, network device 300 declares the link as an active link and adds the neighboring node to the neighbor node list 310. Cloud control protocol module 306 outputs discover messages that each specify the neighbor node list identifying neighboring nodes and interfaces on which neighboring nodes are reachable from network device 300.

In addition, upon receiving a discover message and determining that the discover message does not include a layer two address for a recipient one of the nodes, cloud control protocol module 306 updates a stored intermediate node list 312 ("IM node list") of the discover message that specifies layer two addresses and interfaces for the nodes that the discover message traversed from an originating one of the nodes.

Upon updating the discover message, cloud control protocol module 306 forwards the discover messages to the neighboring nodes that are positioned along paths toward a central controller (e.g., controller 35 of FIG. 1), and the centralized controller, upon receiving the discover messages, establishes a Source Routed Tunnel (SRT) control channel with each of the nodes, including network device 300, based on the intermediate node lists specified by the discover messages. Network device 300 executes the cloud control protocol module 306 without executing an Interior Gateway Protocol (IGP) within a control plane 303 of network device 300.

In some examples, the centralized controller computes the topology information for the network and computes the forwarding information for the transport data channels in accordance with the neighbor node list within each of the discover messages that are received from the network. In these examples, network device 300 receives, from the controller and via the respective SRT control channels, the pre-computed forwarding information computed by the centralized controller for configuring forwarding component 304 of network device 300 to forward the network packets on the data channels. The pre-computed forwarding information may include directed forwarding state for network device 300 to use for sending packets on a data channel. In some examples, the pre-computed forwarding information can program network device with any of a variety of forwarding objects including, for example, configuring firewall filters, pseudowires, and port and MAC based forwarding entries.

In some examples, the directed FIB state includes policers to police ingress traffic for the data channel according to the computed bandwidth. In some examples, WD 110 maintains link scheduling information 128. WD 110 may maintain information regarding error rates for transmission on wireless links in error rates 126, and may update this information in real time as network conditions change. Error rates may be expressed in a particular time it takes to transfer 100 bytes of data, based on sampled measurements, for example. WD 110 can include information regarding error rates, link scheduling, load conditions for the wireless links, in discover messages sent to the centralized controller. WD 110 can indicate that particular links are shared.

Based on the forwarding information and link information, the centralized controller may also compute one or more backup data channels for the network, and outputs one or more messages to network device 300 to communicate and install, within network device 300, forwarding information 330 for the backup data channels. Network device 300 stores the forwarding information for the data channels and the backup data channels to forwarding information 330. Based on forwarding information 330, forwarding component 304 forwards packets received from inbound links 322 to outbound links 324 that correspond to next hops associated with destinations of the packets. In response to a network event, forwarding component 304 may re-route at least a portion of the network packets along the backup data channel. The network event may be, for example, a link or node failure. The controller may also compute detour data channels to handle fast reroute for any interior node failure.

In one example the centralized controller computes, based on the forwarding information, one or more backup data channels for the network, and outputs, from the centralized controller, one or more messages to network device 300 to communicate and install, within network device 300, forwarding information for the backup data channels. In response to a network event, forwarding component 304 of network device 300 re-route at least a portion of the network packets along the backup data channel.

In some examples, when forwarding the discover messages network device 300 modifies the discover messages to include one or more link characteristics associated with the interfaces, and the centralized controller computes the forwarding information for the data channels based at least in part on quality of service (QoS) metrics requested for the data channels and the link characteristics received from the discover messages.

In some examples, network device 300 sends Keepalive packets to the centralized controller network device to ensure a state of the SRT control channel, and, responsive to determining that no Keepalive Reply is received from the centralized controller within a time period, network device 300 generates a new Discover message with a new generation number to force acceptance at a centralized controller network device of a new SRT control channel.

In this manner, network device 300 has a reduced control plane 303 that in some examples does not execute a Multiprotocol Label Switching (MPLS) protocol for allocation and distribution of labels for the data channels and does not execute a routing protocol such as an interior gateway protocol (IGP). Instead, network device 300 executes the cloud control protocol module 306 to receive forwarding information directly from a central controller (e.g., controller 35 of FIG. 1), without requiring conventional protocol signaling, such as MPLS signaling using a label distribution protocol such as LDP or RSVP. The centralized controller network device provides a centralized, cloud-based control plane to configure network device 300 to provide transport data channels between the edge nodes and the mesh nodes for transport of subscriber traffic. In various examples, the messages exchanged between network device 300 and the centralized controller may conform to any of the message formats described herein.

In some examples, after the SRT control channel is established between network device 300 and the centralized controller, the centralized controller may not necessarily compute and install forwarding information to network device 300, but may instead use the SRT control channel to output one or more messages to network device 300 via the SRT control channel and perform one or more control functions on behalf of the network device 300. For example, network device 300 can receive messages from the centralized controller for performing control functions such as configuration of network device 300, monitoring status of the network device 300, image download to network device 300, gathering traffic statistics about network traffic at network device 300, gathering information about local load conditions on network device 300, or gathering information about error rates 326 on network device 300, for example.

In one embodiment, forwarding component 304 may comprise one or more dedicated processors, hardware, and/or computer-readable media storing instructions to perform the techniques described herein. The architecture of network device 300 illustrated in FIG. 22 is shown for example purposes only. In other embodiments, network device 300 may be configured in a variety of ways. In one embodiment, for example, control unit 302 and its corresponding functionality may be distributed within IFCs 320.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of this disclosure have been described. These and other aspects are within the scope of the following claims.

What is claimed is:

1. A system comprising:
   a mesh network comprising a plurality of mesh nodes, wherein each of the plurality of mesh nodes is configured to communicate with one or more subscriber devices;
   one or more edge nodes to couple the mesh network to a core network; and
   a centralized controller in communication with the plurality of mesh nodes and edge nodes, wherein the centralized controller comprises:
      a topology module that executes a control protocol to receive topology information for the mesh network from the plurality of mesh nodes; and
      a path computation module (PCM) that computes forwarding information for
   one or more data channels based at least in part on the topology information, wherein the data channels are for transporting network packets to and from the subscriber devices via the mesh nodes,
   wherein each of the mesh nodes operates a reduced control plane without execution of a layer three (L3) routing protocol that maintains routing information for the mesh network and generates forwarding information for the respective mesh node,
   wherein the topology module receives a set of messages sent by the mesh nodes, wherein each of the set of messages specifies a list of interfaces traversed by the respective message, wherein the centralized controller establishes a control channel with each of the mesh nodes based on the list of interfaces specified by the messages, and
   wherein the centralized controller outputs one or more messages to the mesh nodes via the respective control channels to communicate and install within each of the mesh nodes the forwarding information for the one or more data channels.

2. The system of claim 1, wherein each of the plurality of mesh nodes includes a data plane to perform one or more forwarding operations on the network packets to forward the network packets on the data channels.

3. The system of claim 1, wherein the one or more edge nodes comprise a plurality of edge nodes that provide multiple exit points from the mesh network.

4. The system of claim 1, wherein the plurality of mesh nodes comprises a plurality of wireless devices and one or more wireless access points.

5. The system of claim 1, wherein the plurality of mesh nodes comprises one or more of wired mesh nodes that communicate via a wired connection, wireless mesh nodes that communicate via wireless communications, and mesh nodes that communicate via both wired and wireless connections.

6. The system of claim 1, wherein at least one of the one or more edge nodes and controller are on the same device.

7. The system of claim 1, further comprising:
   an aggregation network comprising one or more aggregation nodes, wherein the central controller is in communication with the aggregation nodes, and wherein the centralized controller outputs one or more messages to the aggregation nodes to communicate and install within each of the aggregation nodes forwarding information for the one or more data channels.

8. The system of claim 1,
   wherein the PCM computes the topology information for the network based on the list of interfaces specified by the messages.

9. The system of claim 1, wherein the set of messages comprises a set of Discover messages, wherein the set of Discover messages specifies capacity of one or more links associated with the interfaces, wherein the path computation module generates the forwarding information for the data channels based at least in part on the topology information and one or more of the capacity of the links associated with the interfaces and path requests for the data channels.

10. The system of claim 9,
    wherein the plurality of mesh nodes comprises one or more of wired mesh nodes that communicate via a wired connection, wireless mesh nodes that communicate via wireless communications, and mesh nodes that communicate via both wired and wireless connections, and
    wherein the one or more links comprise one or more wireless links.

11. The system of claim 10, wherein the path computation module generates scheduling information for scheduling wireless network traffic on the wireless links associated with the interfaces of the wireless mesh nodes.

12. The system of claim 1, wherein the topology module receives a plurality of messages sent by the wireless mesh nodes, wherein each of the plurality of messages specifies a current error rate of one or more wireless links associated with the interfaces, and wherein the centralized controller processes the topology information for the network and computes paths for the data channels in real-time based on the current error rates for the wireless links.

13. The system of claim 1,
    wherein the plurality of mesh nodes comprises one or more of wired mesh nodes that communicate via a wired connection, wireless mesh nodes that communicate via wireless communications, and mesh nodes that communicate via both wired and wireless connections, and wherein the topology module receives a plurality of messages sent by the mesh nodes, wherein each of the plurality of messages specifies load conditions of the network packets at the mesh nodes, and wherein the centralized controller processes the topology information for the network, computes link scheduling information in real-time based on the load conditions for the wireless links, and sends the link scheduling information to the mesh nodes for installation at the mesh nodes.

14. The system of claim 1, wherein the topology module executes an interior routing protocol to receive at least some of the topology information from the edge nodes.

15. The system of claim 1, wherein the topology module receives at least some of the topology information from a centralized topology database.

16. The system of claim 1, wherein the topology module receives a plurality of messages sent by the mesh nodes, wherein each of the plurality of messages specifies load conditions of the network packets at the mesh nodes, and wherein the centralized controller processes the topology information for the network and computes paths for the data channels in real-time based on the load conditions for the links.

17. The system of claim 16,
wherein the plurality of mesh nodes comprises one or more of wired mesh nodes that communicate via a wired connection, wireless mesh nodes that communicate via wireless communications, and mesh nodes that communicate via both wired and wireless connections, and
wherein the one or more links comprise one or more wireless links.

18. The system of claim 1,
wherein each of the mesh nodes executes a discovery protocol that outputs a Hello message on interfaces of the respective mesh node, wherein each of the Hello messages includes an identifier that is unique to the mesh node that sent the Hello message and the interface on which the Hello message was sent, and
wherein, in accordance with the discovery protocol, each of the mesh nodes outputs a Hello reply message on each interface on which a Hello message was received.

19. The system of claim 18, wherein the set of messages comprises a set of Discover messages, wherein, responsive to receiving the Hello reply messages, each of the mesh nodes outputs the Discover messages, each of which specifies a neighbor node list identifying neighboring nodes and interfaces on which the mesh nodes are reachable from the outputting one of the mesh nodes.

20. The system of claim 19, wherein each of the mesh nodes, upon receiving a Discover message and determining that the Discover message does not include a layer two address for the respective mesh node, updates an intermediate node list of the Discover message that specifies layer two addresses and interfaces for the mesh nodes that the Discover message traversed from an originating one of the mesh nodes.

21. The system of claim 20, wherein each of the mesh nodes, upon updating the Discover messages, forwards the Discover messages to the neighboring mesh nodes that are positioned along paths toward the centralized controller, and
wherein the centralized controller, upon receiving the Discover messages, establishes a Source Routed Tunnel (SRT) control channel with each of the mesh nodes based on the intermediate node lists specified by the Discover messages.

22. The system of claim 21, wherein the centralized controller computes the topology information for the network and computes the forwarding information for the data channels in accordance with the neighbor node list within each of the Discover messages that are received from the network.

23. The system of claim 21, wherein the mesh nodes receive, from the centralized controller and via the respective SRT control channels, the forwarding information computed by the centralized controller for configuring forwarding planes of the mesh nodes to forward the network packets on the data channels.

24. The system of claim 21, wherein, based on the forwarding information, the centralized controller computes one or more backup data channels for the network, wherein the centralized controller outputs one or more messages to the mesh nodes to communicate and install, within the mesh nodes, forwarding information for the backup data channels, and wherein, in response to a network event, forwarding components of one or more of the mesh nodes re-route at least a portion of the network packets along the backup data channel.

25. The system of claim 21,
wherein each of the mesh nodes updates the Discover messages to include one or more link characteristics associated with the interfaces, and
wherein the centralized controller computes the forwarding information for the data channels based at least in part on quality of service (QoS) metrics requested for the data channels and the link characteristics received from the flood messages.

26. A method for configuring a mesh network having a plurality of mesh nodes to transport network packets between mesh nodes and a plurality of edge nodes, the method comprising:
by a centralized controller of the mesh network, receiving topology information from the plurality of mesh nodes and a plurality of edge nodes;
by a path computation module (PCM) of the centralized controller of the mesh network, computing forwarding information for one or more transport data channels based at least in part on the topology information, wherein the data channels are for transporting network packets between the mesh nodes and the edge nodes;
receiving, by the topology module of the centralized controller, a set of messages sent by the mesh nodes, wherein the set of messages specifies a list of interfaces traversed by the respective message;
establishing, by the centralized controller, a control channel with each of the mesh nodes based on the list of interfaces specified by the messages;
outputting, by the centralized controller of the network and via the respective control channels, one or more messages to communicate and install within each of the mesh nodes, the forwarding information for establishing the one or more data channels, wherein each of the mesh nodes operates a reduced control plane without execution of a layer three (L3) routing protocol that maintains routing information for the mesh network and generates forwarding information for the mesh nodes;
receiving the network packets associated with a plurality of subscriber devices; and forwarding, by the plurality of mesh nodes, the network packets along the data channels between the mesh nodes and the edge nodes.

27. The method of claim 26, wherein the plurality of mesh nodes comprises one or more of wired mesh nodes that communicate via a wired connection, wireless mesh nodes that communicate via wireless communications, and wireless mesh nodes that communicate via both wired and wireless connections.

28. The method of claim 26, further comprising outputting, by the centralized controller, one or more messages to the mesh nodes to communicate and install within each of the mesh nodes the forwarding information for one or more of the data channels for transporting the network packets between the mesh nodes and the edge nodes.

29. The method of claim 28, further comprising:
computing, by the PCM of the centralized controller, topology information for the mesh network based on the list of interfaces specified by the messages; and
computing, by the PCM of the centralized controller, the forwarding information for data channels based at least in part on the topology information for the mesh network.

30. The method of claim 28, further comprising:
outputting, within each of the mesh nodes a Hello message on interfaces of the mesh nodes, wherein each of the Hello messages includes an identifier that is unique to the wireless device that outputs the Hello message and the interface on which the Hello message was sent, and
outputting, by each of the mesh nodes, a Hello reply message on each interface on which a Hello message was received.

31. The method of claim 28, wherein the set of messages comprises a set of Discover messages, further comprising outputting, by the mesh nodes in response to receiving the Hello reply messages, Discover messages, each of which specifies a neighbor node list identifying neighboring nodes and interfaces on which the mesh nodes are reachable from the outputting one of the mesh nodes.

32. The method of claim 31, further comprising:
forwarding the Discover messages within the network by the mesh nodes; and
when forwarding the Discover messages, updating the Discover messages to include an intermediate node list of the Discover message that specifies layer two addresses and interfaces for the mesh nodes that the Discover message traversed from an originating one of the mesh nodes.

33. The method of claim 32, further comprising:
receiving the Discover messages by the centralized controller; and
upon receiving the Discover messages with the centralized controller, establishing a Source Routed Tunnel (SRT) control channel from the centralized controller to each of the mesh nodes along the intermediate node lists specified by the Discover messages.

34. The method of claim 33, further comprising computing, by the centralized controller, the topology information for the mesh network and the forwarding information for the data channels in accordance with the neighbor node list within each of the Discover messages that are received from the mesh network.

35. The method of claim 33, further comprising receiving, by the mesh nodes, from the controller and via the respective SRT control channels, the forwarding information computed by the centralized controller for configuring forwarding planes of the mesh nodes to forward the network packets on the data channels.

36. A system comprising:
a mesh network comprising a plurality of mesh nodes each configured to communicate with one or more subscriber devices; and
a centralized controller in communication with the plurality of mesh nodes and edge nodes,
wherein each of the mesh nodes forwards one or more Discover messages to neighboring mesh nodes are positioned along paths toward the centralized controller, wherein each of the Discover messages specifies an intermediate node list that specifies layer two addresses and interfaces for the mesh nodes that the respective Discover message traversed from an originating one of the mesh nodes,
wherein the centralized controller is configured to, upon the centralized controller receiving the Discover messages, establish a Source Routed Tunnel (SRT) control channel with each of the mesh nodes based on the intermediate node lists specified by the Discover messages, and
wherein the centralized controller outputs one or more messages to one or more of the mesh nodes via the SRT control channel to perform one or more control functions on behalf of the mesh nodes.

37. The system of claim 36, wherein the one or more control functions comprise one or more of configuration of the mesh nodes, monitoring status of the mesh nodes, image download to the mesh nodes, gathering traffic statistics about network traffic at the mesh node, gathering information about local load conditions on the mesh nodes, or gathering information about error rates on the mesh nodes.

38. The system of claim 36, wherein the one or more control functions comprises computing forwarding information for one or more data channels based at least in part on topology information received from the one or more mesh nodes via the Discover messages, wherein the data channels are for transporting network packets to and from subscriber devices via the mesh nodes.

* * * * *